US012545335B2

(12) United States Patent
Henning et al.

(10) Patent No.: US 12,545,335 B2
(45) Date of Patent: Feb. 10, 2026

(54) BULKHEADS FOR ENCLOSED CARGO TRANSPORTERS

(71) Applicant: Rite-Hite Holding Corporation, Milwaukee, WI (US)

(72) Inventors: Bruce Henning, Dubuque, IA (US); Frank Heim, Platteville, WI (US); Jared Lueken, Dyersville, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 952 days.

(21) Appl. No.: 17/481,097

(22) Filed: Sep. 21, 2021

(65) Prior Publication Data
US 2022/0089226 A1  Mar. 24, 2022

Related U.S. Application Data

(60) Provisional application No. 63/081,161, filed on Sep. 21, 2020.

(51) Int. Cl.
*B62D 3/04* (2006.01)
*B62D 27/06* (2006.01)
*B62D 33/04* (2006.01)

(52) U.S. Cl.
CPC ............. *B62D 33/04* (2013.01); *B62D 27/06* (2013.01)

(58) Field of Classification Search
CPC ......... B62D 33/04; B62D 27/06; B60P 3/205; B60P 7/14
(Continued)

(56) References Cited

U.S. PATENT DOCUMENTS 4,880,342 A * 11/1989 Pradovic ................... B60P 7/14
410/127
5,010,943 A * 4/1991 Boyer ..................... B60P 3/205
160/351
(Continued)

FOREIGN PATENT DOCUMENTS

EP  1254807  11/2002
EP  1580072  9/2005
(Continued)

OTHER PUBLICATIONS

International Searching Authority, "Invitation to Pay Additional Fees And, Where Applicable, Protest Fee", Issued in connection with International Patent Application No. PCT/US2021/051347 on Jan. 10, 2022, 13 pages.
(Continued)

*Primary Examiner* — Lori Lyjak
(74) *Attorney, Agent, or Firm* — Hanley, Flight & Zimmerman, LLC

(57) ABSTRACT

Example bulkheads for enclosed cargo transporters (e.g., trailers, trucks, reefers, and containers) are disclosed. An example bulkhead includes a first panel and a second panel adjoining the first panel to define a partition that includes a first lateral edge along the first panel and a second lateral edge along the second panel. The partition has a partition width extending from the first lateral edge to the second lateral edge. A harness is structured to extend beyond the partition width. The harness includes a breakaway fastener assembly that renders the bulkhead in an operative configuration and a restorable breakaway configuration. The breakaway fastener assembly is to couple to the partition when the bulkhead is in the operative configuration, and the breakaway fastener assembly to decouple from the partition when the bulkhead is in the restorable breakaway configuration.

21 Claims, 25 Drawing Sheets

(58) Field of Classification Search
USPC .................................................. 296/182.1
See application file for complete search history.

(56) References Cited

U.S. PATENT DOCUMENTS

| | | | | |
|---|---|---|---|---|
| 5,054,295 | A * | 10/1991 | Goulooze | B60H 1/3232 |
| | | | | 410/127 |
| 5,161,848 | A | 11/1992 | Lutton | |
| 6,305,128 | B1 * | 10/2001 | Horner | B60P 3/205 |
| | | | | 160/40 |
| 6,626,625 | B2 * | 9/2003 | Nelson | B61D 17/048 |
| | | | | 410/140 |
| 9,796,324 | B2 * | 10/2017 | Daugherty | B60P 7/14 |
| RE46,663 | E * | 1/2018 | Nelson | B61D 17/048 |
| 2002/0108725 | A1 | 8/2002 | Nelson et al. | |
| 2005/0163584 | A1 | 7/2005 | Clark | |
| 2006/0228185 | A1 * | 10/2006 | Faivre | B60P 7/14 |
| | | | | 410/129 |
| 2008/0069659 | A1 * | 3/2008 | Carson | B65D 90/0066 |
| | | | | 410/103 |
| 2010/0119323 | A1 * | 5/2010 | Nelson | B61D 45/006 |
| | | | | 410/130 |
| 2020/0001770 | A1 | 1/2020 | Knox | |

FOREIGN PATENT DOCUMENTS

| | | |
|---|---|---|
| JP | 2000108774 | 4/2000 |
| JP | 2014031068 | 2/2014 |

OTHER PUBLICATIONS

International Searching Authority, "International Search Report and Written Opinion of the International Searching Authority", issued in connection with International Patent Application No. PCT/US2021/051347 on Apr. 4, 2022, 9 pages.

Patent Cooperation Treaty, "International Preliminary Report on Patentability," issued in connection with International Appl. No. PCT/US2021/051347, dated Mar. 21, 2023, 12 pages.

* cited by examiner

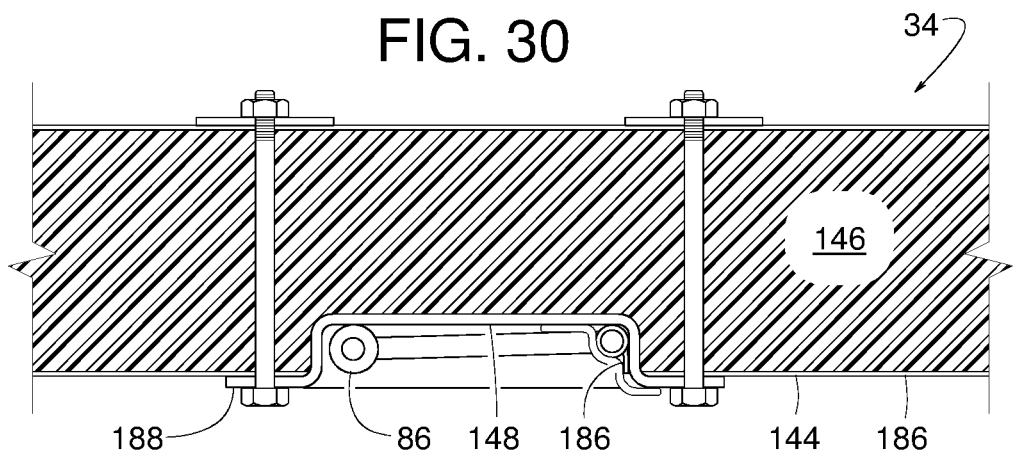
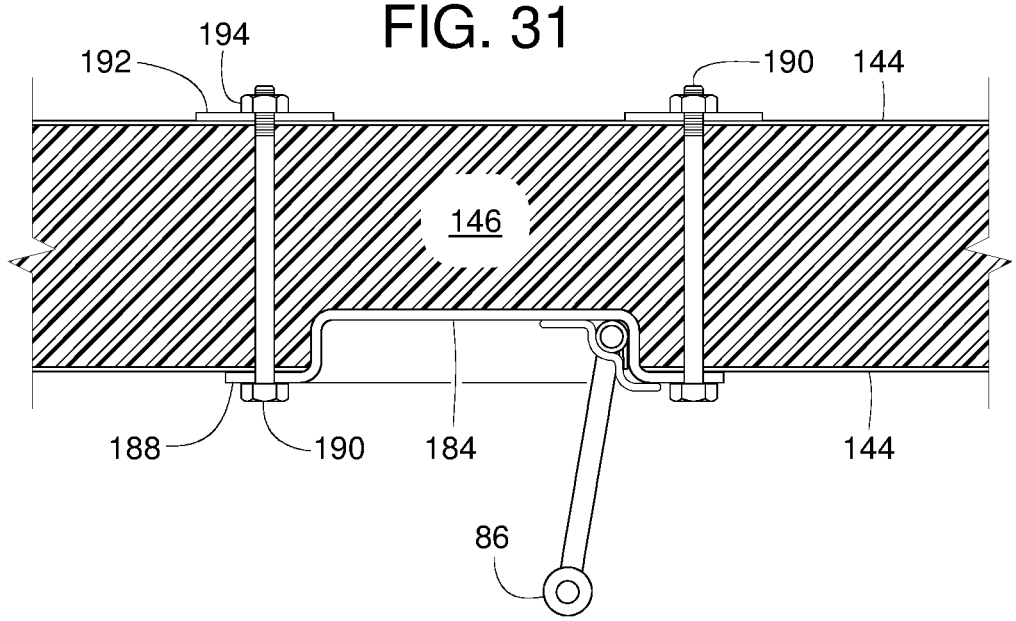
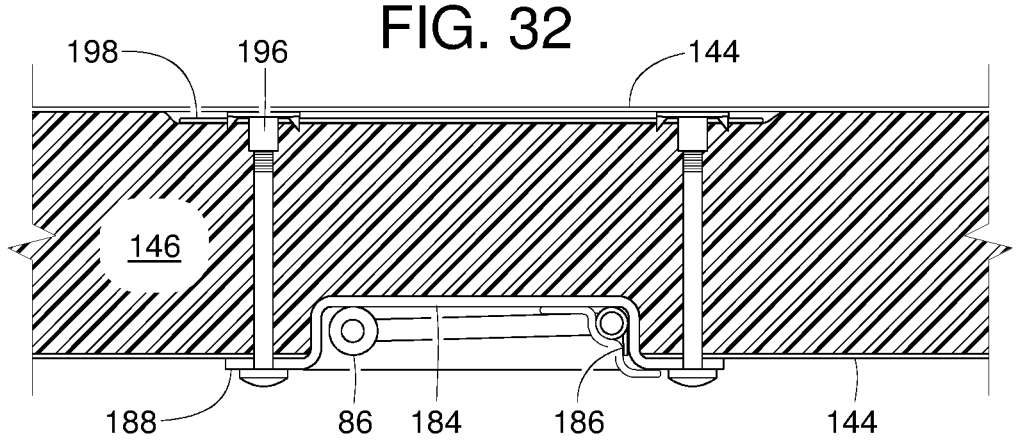

BULKHEADS FOR ENCLOSED CARGO TRANSPORTERS

CROSS-REFERENCE TO RELATED APPLICATION

This patent claims the benefit of U.S. Patent Provisional Application 63/081,161, which was filed on Sep. 21, 2020, and is hereby incorporated herein by reference in its entirety.

FIELD OF THE DISCLOSURE

This disclosure relates generally to enclosed cargo transporters, such as trailers, trucks, and containers and, more particularly, relates to bulkheads for enclosed cargo transporters.

BACKGROUND

Bulkheads are movable partitions used inside the cargo storage area of enclosed cargo transporters, such as refrigerated trucks, enclosed trailers, vans, and the like. Some bulkheads are designed to span first and second dimensions (i.e., a cross-sectional plane) of the cargo storage area, so they can divide the storage area into separate compartments along a third dimension of the storage area.

Bulkheads can be thermally insulative, such that adjacent compartments within a cargo transporter can be maintained within different temperature ranges according to the requirements of the cargo. For example, an insulated bulkhead may separate one or more freezer sections, refrigerated sections, ambient temperature sections, and/or various combinations thereof. Some cargo transporters utilize environmental control (e.g., heating, refrigeration, etc.) systems which can include one or more remote heat exchanger units positioned within individual compartments defined/separated by bulkheads to maintain the desired environment (e.g., temperature, humidity, etc.) there within. Providing a cargo transporter with multiple compartments capable of maintaining different environmental conditions, temperature ranges for example, is particularly useful in the food delivery industry. Frozen goods (e.g., ice cream and pizza) can be stored in the freezer section, refrigerated goods (e.g., milk and fresh vegetables) can be kept in the refrigerated section, and dry goods (e.g., cereal and paper towels) can be placed in the ambient temperature section.

To create compartments of various and/or adjustable sizes thereby accommodating particular load proportions (e.g., frozen vs. refrigerated vs. ambient), bulkheads are generally moved manually (e.g., by a dock worker or driver) to different locations within the cargo storage area. Straps on the bulkhead, connectable to tracks or other anchor points on the interior of the cargo storage area, can be used to hold bulkheads in place during transport.

BRIEF DESCRIPTION OF THE DRAWINGS

FIG. 30 is a cross-sectional view taken along line 30-30 of FIG. 9.

FIG. 31 is a cross-sectional view similar to FIG. 30 but showing an example handle in an example extended.

FIG. 32 is a cross-sectional view similar to FIG. 30 but showing an example handle mounting arrangement disclosed herein.

DETAILED DESCRIPTION

Figure 1:
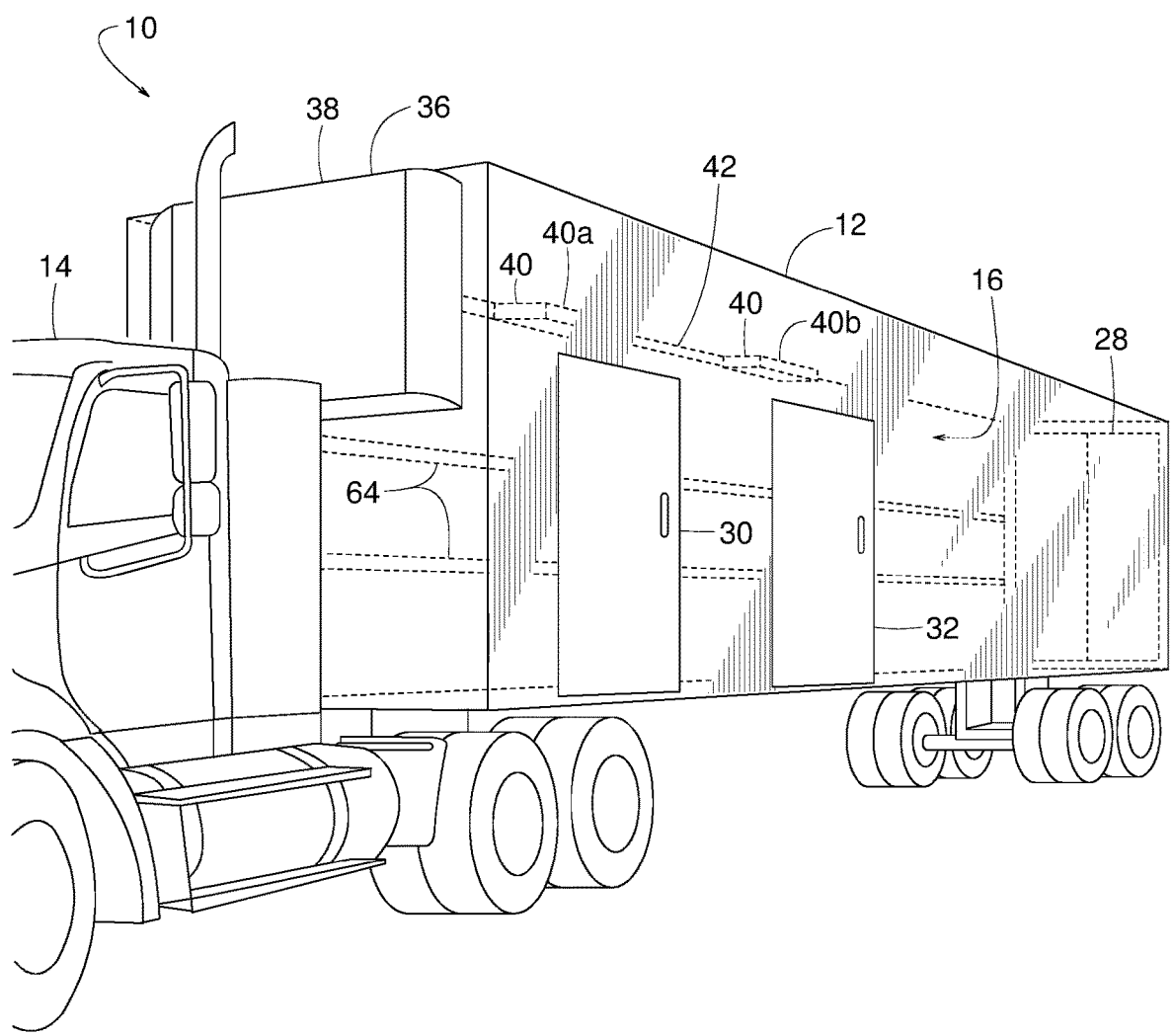
FIG. 1 is a perspective view of an example cargo transporter having an example refrigerated trailer hitched to an example tractor.

Example bulkheads for enclosed cargo transporters (e.g., trailers, trucks, reefers, and containers) are disclosed. Example bulkheads include (e.g., manually) movable lightweight panels for dividing the cargo transporter's cargo storage area into separate storage compartments. Some example bulkheads include a strap harness for attaching the bulkhead to multiple retaining tracks that are mounted on side walls of the cargo storage area at various heights. In some examples, a single strap tightening member can be used to tighten a harness at multiple points simultaneously. Some example bulkheads include one or more other features, such as restorable breakaway straps, wing lip seals, hollow foam seals, spring-loaded recessed handles, ergonomic handles with breakaway fasteners (e.g., plastic fasteners), and/or hinge stiffeners.

FIGS. 1-6 show an example cargo transporter 10 having a refrigerated (i.e., temperature-controlled) trailer 12 hitched to a tractor 14. Other examples of the cargo transporter 10 include refrigerated (i.e., temperature-controlled) trucks, shipping containers, vans and the like. In the illustrated example, a cargo storage area 16 within the trailer 12 is defined by a ceiling 18, a floor 20, a front wall 22, a back wall 24, and two side walls 26. In the illustrated example, a rear door 28 and first and second side doors 30 and 32 provide access to the cargo storage area 16.

In some examples, one or more example bulkheads 34 can divide the cargo storage area 16 into separate smaller compartments, each of which can maintain one or more environmental conditions within a different range. In some examples, one or more environmental control units 36 can be utilized to adjust and/or maintain various environmental conditions within the cargo storage area 16 or compartments therein. For explanatory purposes, the following description will reference an example refrigeration unit installed in a trailer 12, though it should be understood that environmental control unit 36 can take various forms not limited to a refrigeration unit (removing heat from and thereby lowering the temperature) and be utilized to adjust and/or maintain various environmental conditions other than or in addition to temperature.

In the illustrated example of FIG. 1, the refrigeration unit 36 is shown to include an exterior unit 38 and multiple interior units 40 (e.g., interior unit 40a and 40b). The units 38 and 40 are interconnected by tubing 42 to create a closed loop refrigerant circuit including a refrigerant compressor and condenser in the exterior unit 38, an evaporator in each of the indoor units 40, and fluid expansion devices immediately upstream of each of the evaporators.

To lower the temperature within the cargo storage area 16, evaporator fans of the interior units 40 circulate air across the heat exchanger to draw heat from within the cargo storage area 16 into the refrigerant, while a condenser fan of the exterior unit 38 releases the heat from the refrigerant outside the cargo storage area 16. In some examples, the exterior unit 38 further includes an integral evaporator that is used as an alternative and/or in addition to the interior units 40.

Figure 2:
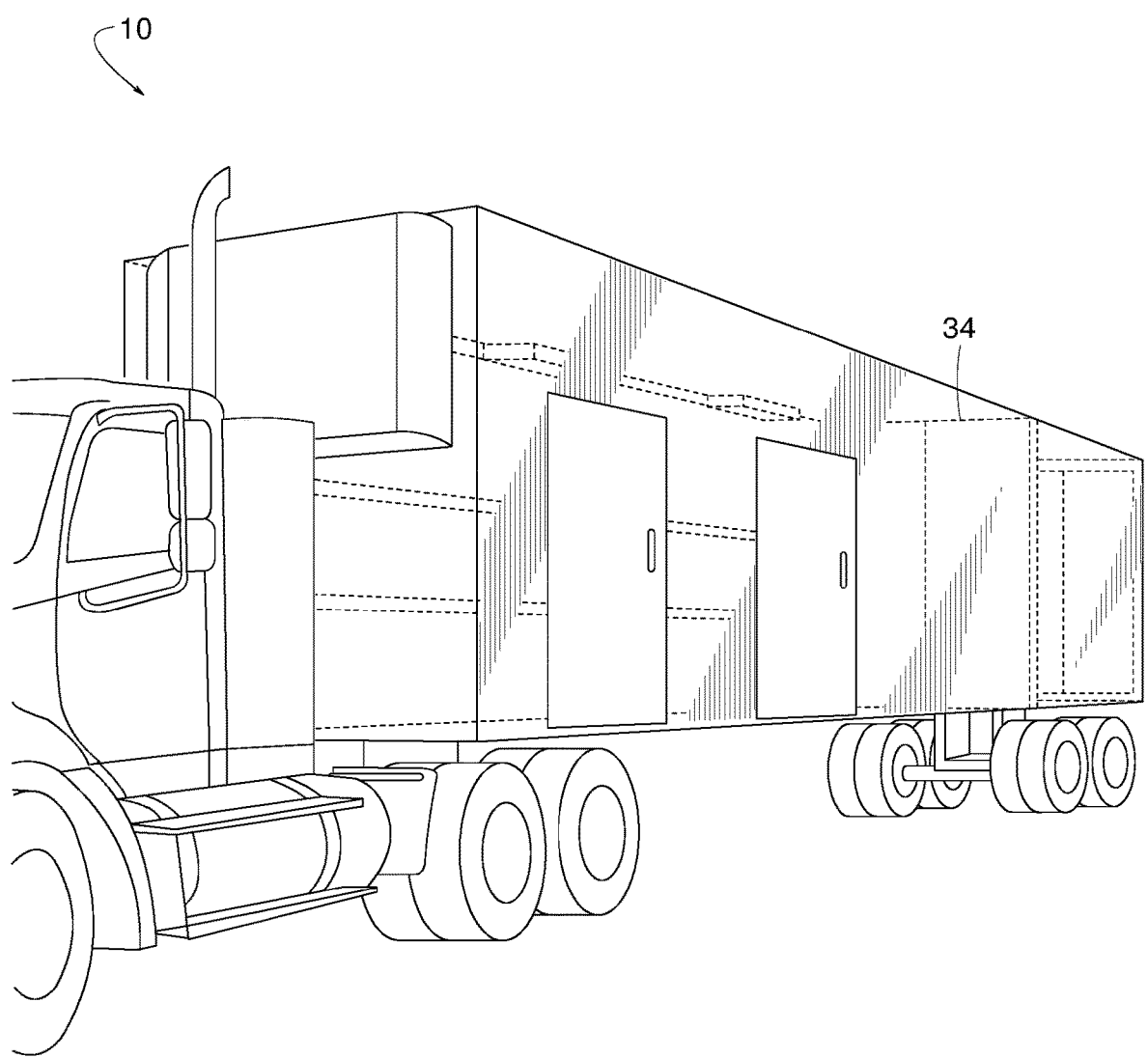
FIG. 2 is a perspective view similar to FIG. 1 but showing an example bulkhead constructed in accordance with teachings disclosed herein and installed within an example cargo storage area of the example cargo transporter.
Figure 3:
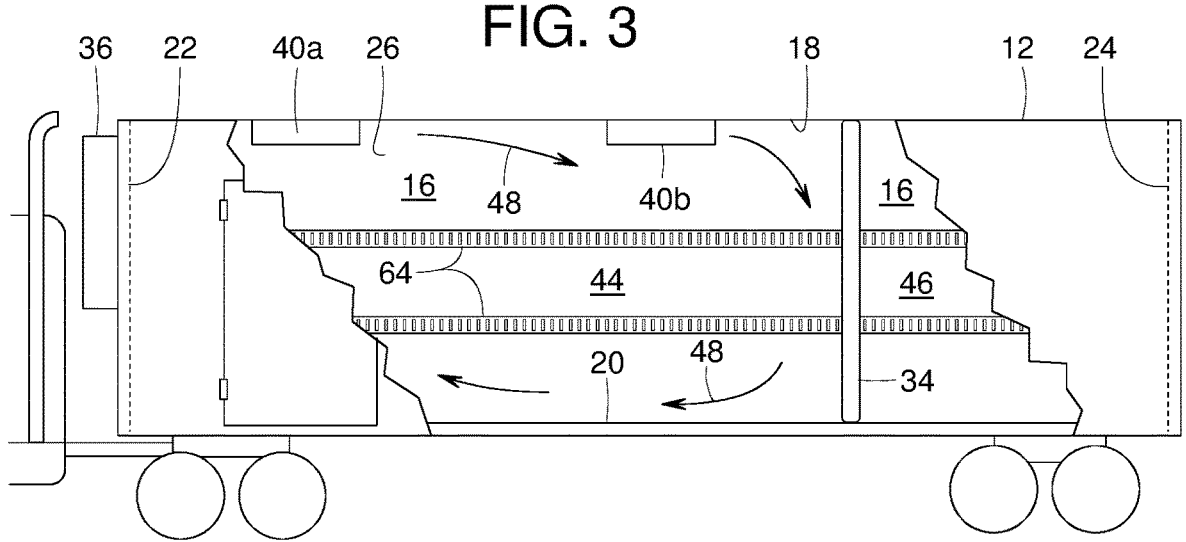
FIG. 3 is a cutaway side view of FIG. 2.

As previously mentioned, one or more example bulkheads 34 can be used to divide the cargo storage area 16 into multiple compartments to be maintained within different temperature ranges. FIGS. 2 and 3, for example, show a single bulkhead 34 installed within the trailer 12 for separating the cargo storage area 16 into a chilled (i.e., lower than ambient temperature) section 44 and an ambient temperature section 46. In this example, both the interior units 40a and 40b generate cool (i.e., lower than ambient temperature) air 48 for cooling (i.e., lowering or maintaining the temperature below ambient temperature of) the chilled section 44.

Figure 4:
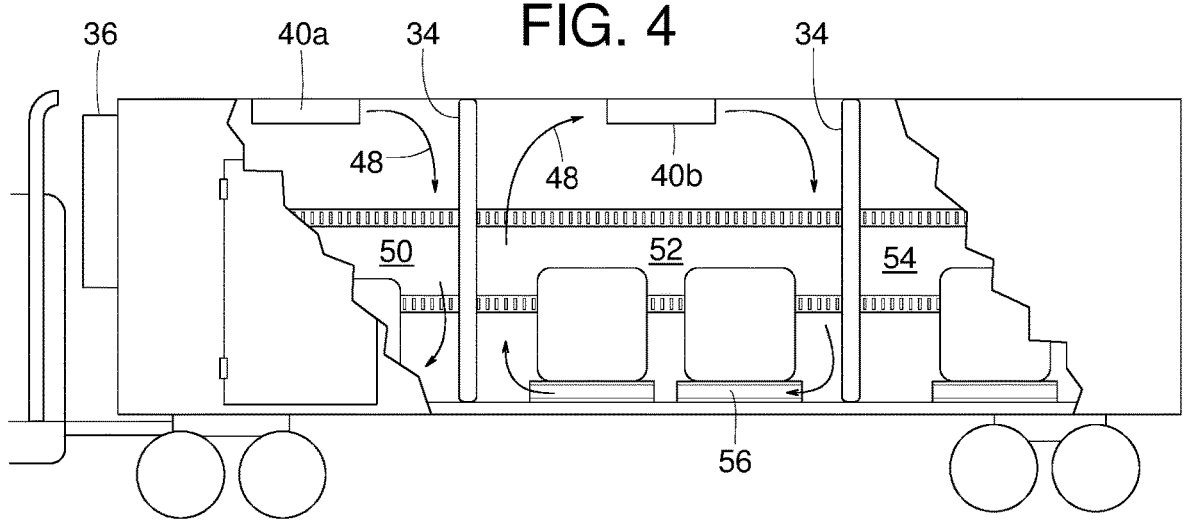
FIG. 4 is a cutaway side view similar to FIG. 3 but showing example bulkheads installed within the example cargo storage area.
Figure 5:
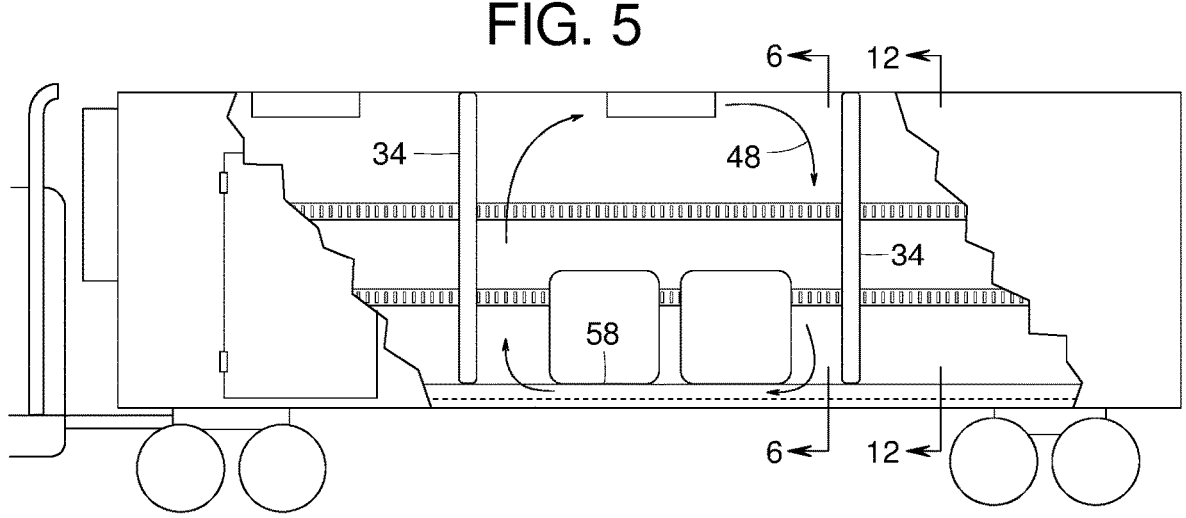
FIG. 5 is a cutaway side view similar to FIG. 4 but showing an example cargo transporter with a different type of floor.
Figure 6:
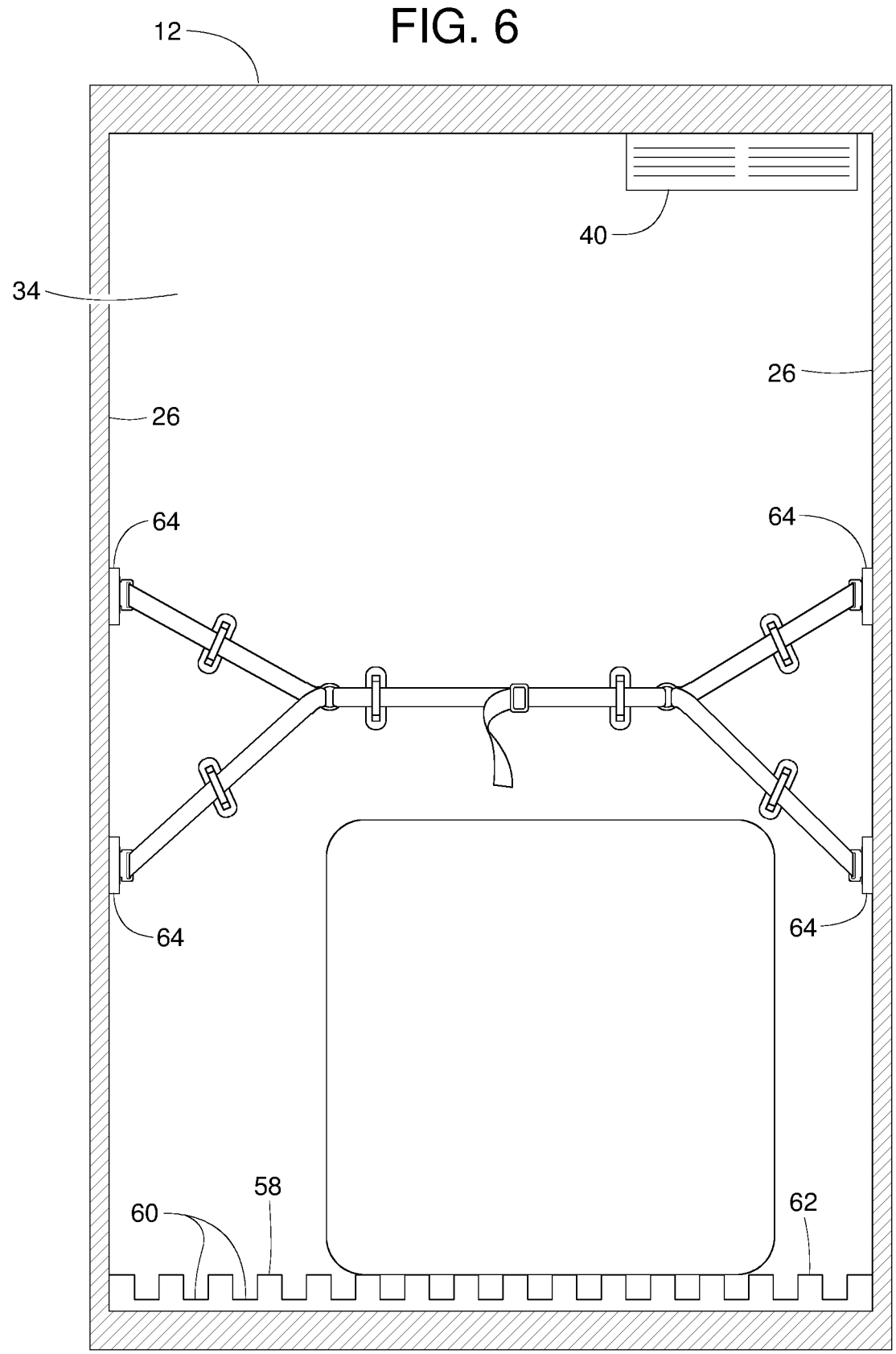
FIG. 6 is a cross-sectional view taken along line 6-6 of FIG. 5.

In the example shown in FIG. 4, (e.g., two) bulkheads 34 are installed within the trailer 12 for separating the cargo storage area 16 into three compartments. This configuration may be necessitated by, for example, the cargo requiring environmental conditions which can be satisfied by one of three options. For example, transportation of cargo including frozen and fresh food within a single cargo storage area can be accomplished by creating a freezer section 50 (e.g., below 30 degrees F.), a refrigerated section 52 (e.g., between about 40-50 degrees F.), and an ambient temperature section 54 (e.g., no temperature requirement). The interior unit 40a and/or an integral evaporator of the exterior unit 36 maintains the temperature of the freezer section 50 according to requirements, the interior unit 40b maintains the temperature of the refrigerated section 52 according to requirements, and the ambient temperature section 54 is unconditioned. Some examples of bulkheads 34 provide thermal insulation to reduce (e.g., minimize) or control heat transfer between adjacent sections. Bulkhead 34 can provide a physical barrier to reduce heat transfer via convection (i.e., air mixing) around and via conduction through the materials that make up the bulkhead. In some examples, pallets 56 support units of cargo and enable air circulation within each compartment. In addition or as an alternative to pallets 56, a corrugated or otherwise grooved floor 58 can allow the circulation of conditioned air. One example of the floor 58 is shown in FIGS. 5 and 6. Grooves 60 in floor 58 not only provide passageways for air to circulate but also channel possible condensate, other liquids, and/or debris from the upper surface 62 of the floor 20.

Figure 7:
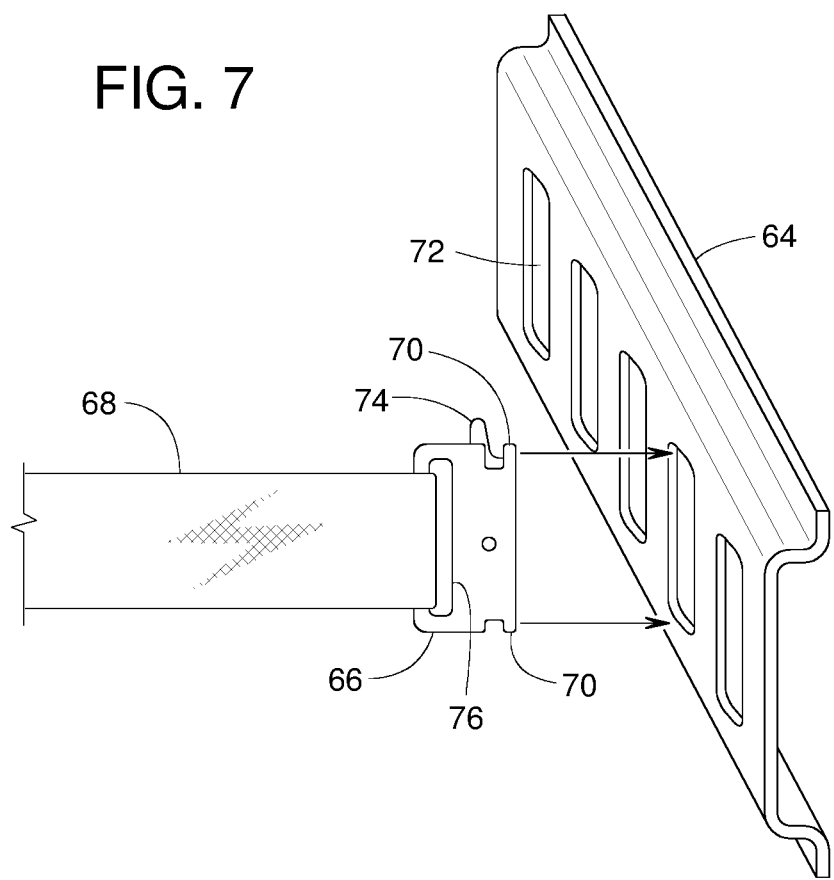
FIG. 7 is a perspective view of an example strap in an example release position relative to an example retaining track.
Figure 8:
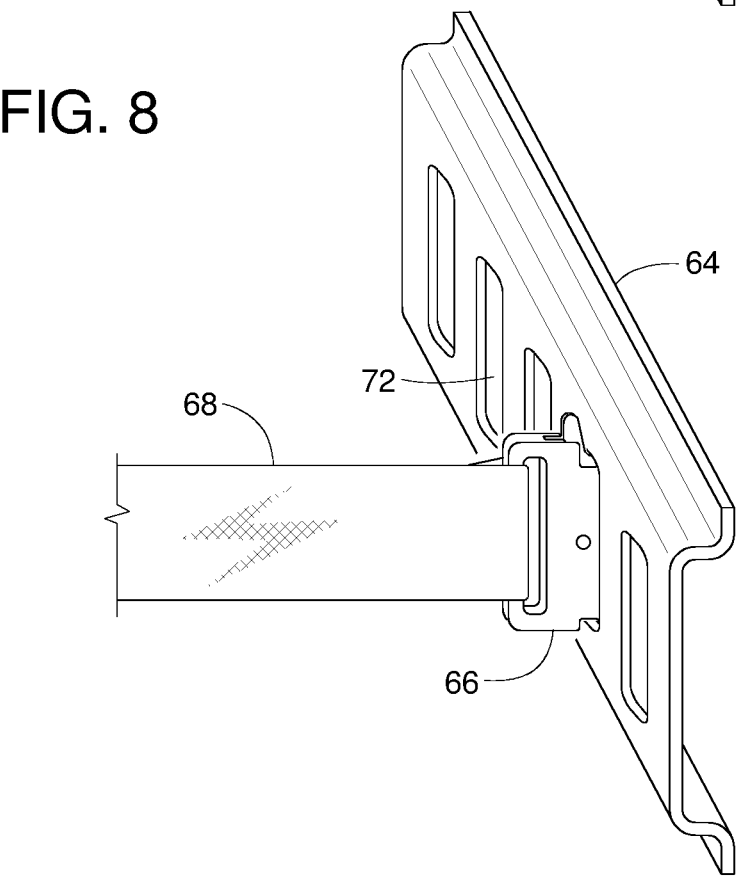
FIG. 8 is a perspective view similar to FIG. 8 but showing the strap in an example attached position relative to the retaining track.

FIG. 6 also shows upper and lower retaining tracks 64 on both right and left interior side walls 26 of trailer 12. The retaining tracks 64 are used along with clips 66 and straps 68 as tie-downs for retaining loads and/or for holding bulkheads 34 in place. Some examples of retaining tracks 64 include E-tracks, A-tracks, L-tracks, and Q'Straint tracks. Some examples of straps 68 are tightened and cinched by various hardware such as ratchet mechanisms, cam buckles, double-rings, etc. The term, "strap" refers to any elongate member having a width greater than its thickness and is sufficiently pliable to be folded back over onto itself and later unfolded without causing appreciable permanent damage to the material. The term, "clip" refers to any fastener or connector that can readily latch onto or is otherwise connectable to the retaining track 64. In the example shown in FIGS. 7 and 8, the clip 66 includes an E-track connector that includes tabs 70 that retain the clip 66 within receiving slots 72 of the retaining track 64, a spring loaded release lever 74 for selectively locking and releasing the clip 66 by moving the tabs 70, and an aperture 76 through which the strap 68 is laced and connected to itself to couple the strap 68 to the clip 66.

Figure 9:
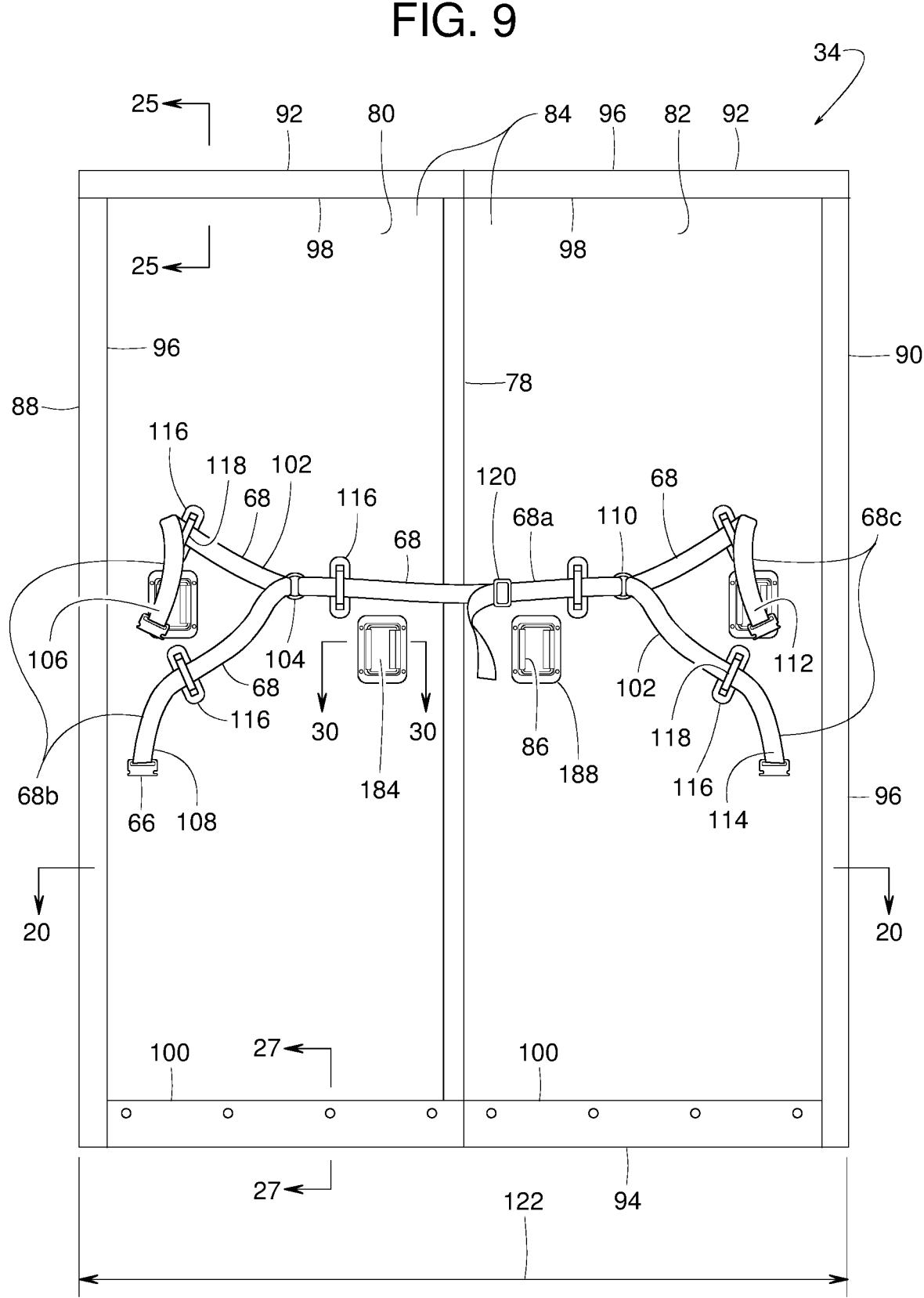
FIG. 9 is a front view of an example bulkhead disclosed herein shown in an example operative configuration.
Figure 10:
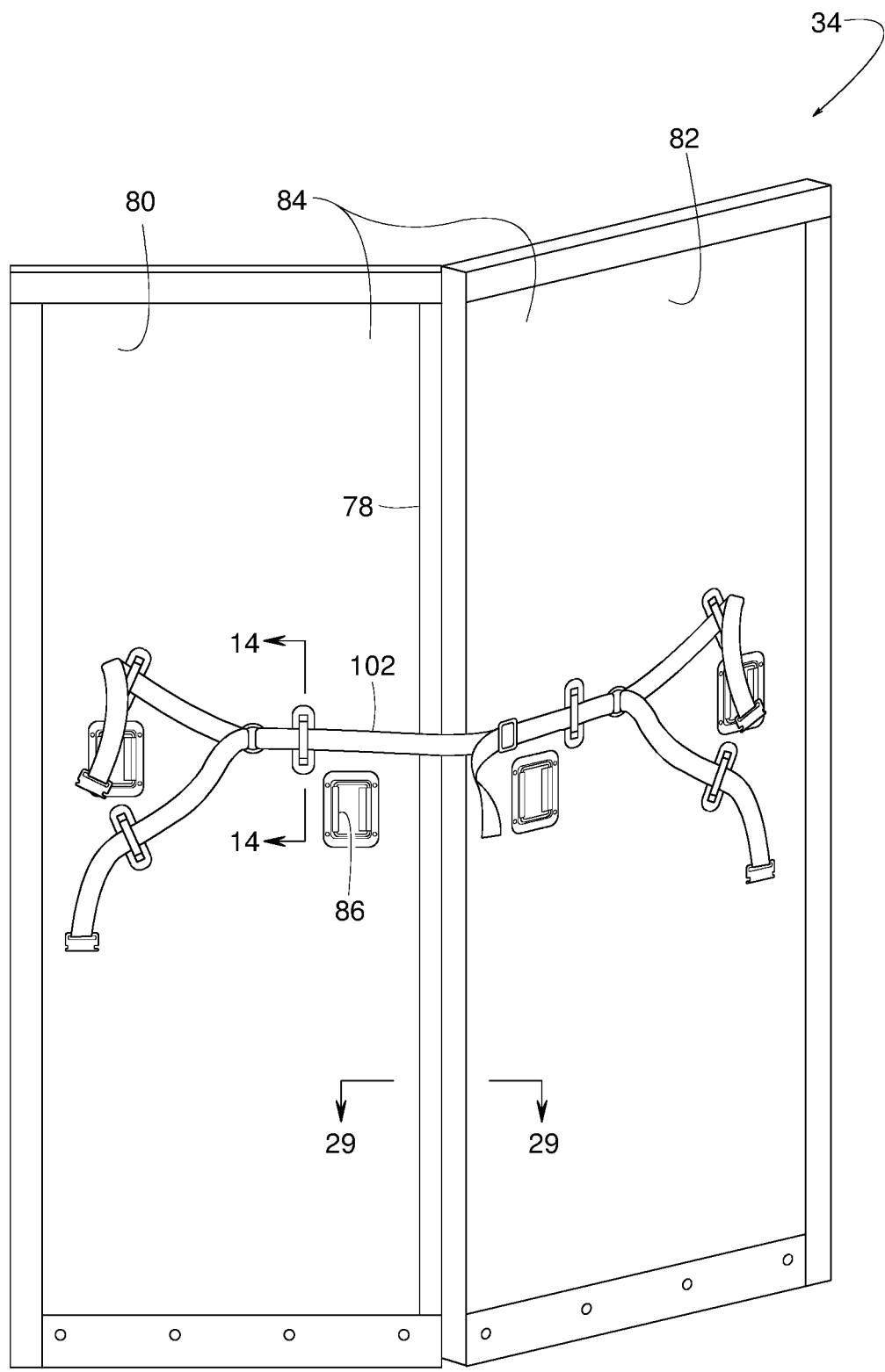
FIG. 10 is a front view similar to FIG. 9 but showing the example bulkhead pivoting about an example hinge disclosed herein.

FIGS. 9-12 show an overall construction of an example bulkhead 34, and FIGS. 13-32 show examples of more specific details/features of the example bulkheads 34. In the example shown in FIGS. 9-12, the bulkhead 34 includes a universal hinge 78 connecting a first panel 80 to a second panel 82 to create a hinged partition 84. The hinge 78 enables panels 80 and 82 to pivot about a generally vertical axis between a generally planar configuration (FIG. 9) and a folded configuration (FIG. 10).

The partition 84 is generally in the planar configuration when the bulkhead 34 is installed and secured, dividing the cargo storage area 16 into separate compartments. The partition 84 is generally in the folded configuration (FIG. 10) during the process of moving or positioning the bulkhead 34 or when it is set aside or stored more compactly when not in use. For ease of positioning, some examples of bulkhead 34 include handles 86.

In the illustrated example, the partition 84 includes a first lateral edge 88 along the first panel 80, a second lateral edge 90 along the second panel 82, an upper edge 92, and a lower edge 94. In some examples, the partition 84 includes a vertically elongate seal 96 along each lateral edge 88 and 90, and a horizontally elongate seal 98 along the upper edge 92. Some examples of seals 96 and 98 are relatively soft and resiliently compliant to provide an effective seal between the outer periphery of the partition 84 and irregular surfaces of the walls 26 and/or ceiling 18. In some examples, a durable reinforcement material layer 100 protects the lower edge 94 against wear.

To hold the partition 84 in place within the cargo storage area 16, some examples of the bulkhead 34 include an example harness 102 attached to the partition 84 and connectable to the retainer tracks 64. The term, "harness" refers to any configuration or assembly of one or more pliable elongate members (e.g., straps, belts, cables, ropes, wires, chains, etc.) restraining or maintaining the position of a partition 84 within the cargo storage area 16. The term, "pliable" refers to any member that is sufficiently flexible to be folded back over onto itself and later unfolded without leaving the member with significant permanent damage and/or deformation.

The harness 102 of the illustrated example includes an assembly of straps 68 including a middle section 68a, a first pair of branches 68b, and a second pair of branches 68c. In the illustrated example of FIG. 9, the first pair of branches 68b extends from a first end 104 of the horizontally-oriented middle section 68a and terminates at a first upper end 106 and a first lower end 108. The second pair of branches 68c extends from a second end 110 of the horizontally-oriented middle section 68a and terminates at a second upper end 112 and a second lower end 114.

Figure 12:
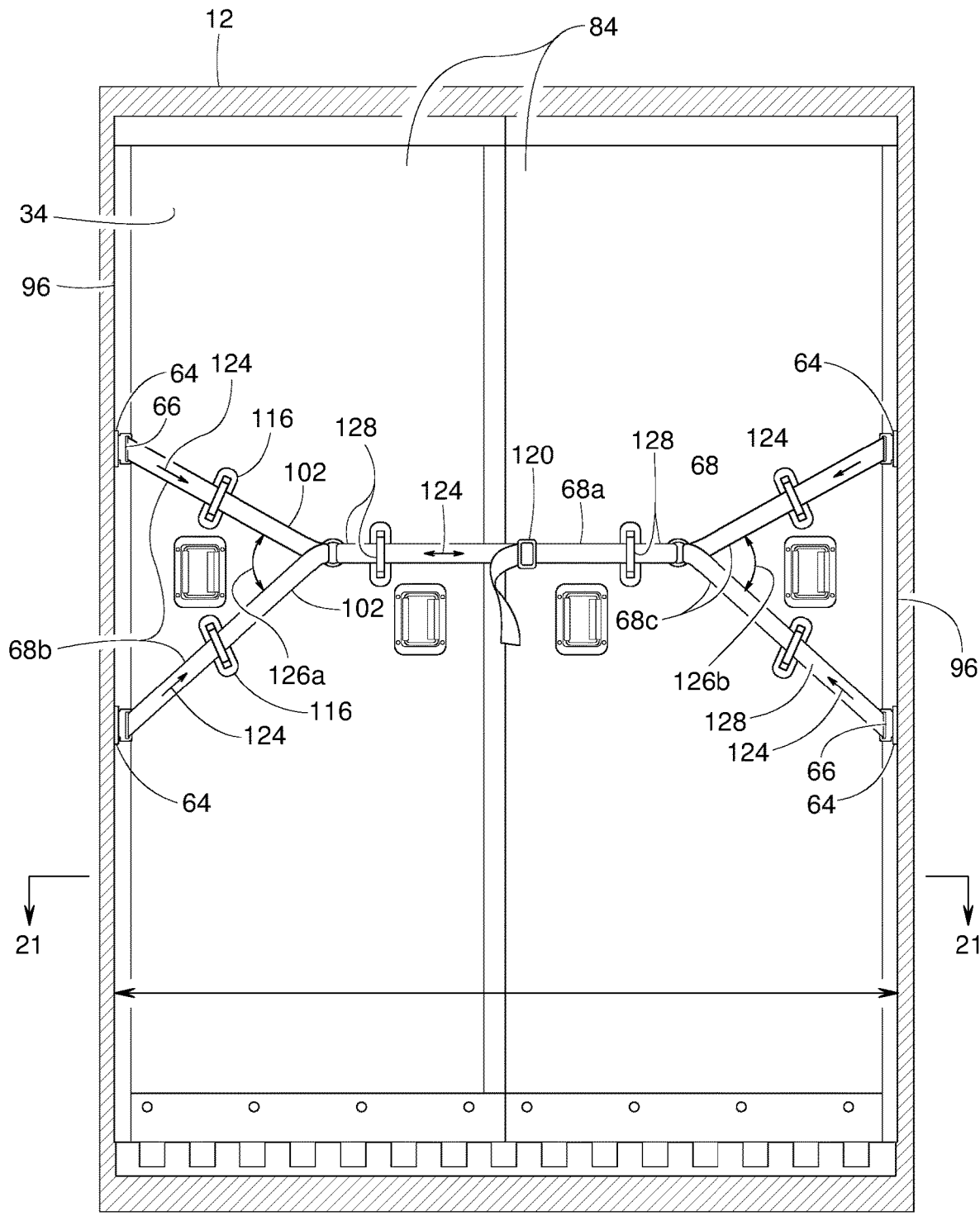
FIG. 12 is a cross-sectional view taken along line 12-12 of FIG. 5.

In the illustrated example of FIG. 12, a clip 66 is attached to each of the ends 106, 108, 112, and 114 connecting the harness 102 to the retaining tracks 64. A plurality of fasteners 116 with loops 118 through which the straps 68 extend couple the harness 102 to the partition 84. Accordingly, movement of the strap 68 in a direction perpendicular to the plane of the partition 84 and in a direction perpendicular relative to a longitudinal axis of the strap 68 (e.g., an up-and-down direction in the orientation of FIG. 9) is limited by the loop 118, while movement of the strap 68 in a direction parallel to the plane of the partition 84, particularly along a longitudinal axis of the strap 68 (e.g., a side-to-side direction in the orientation of FIG. 9) is enabled by the loop 118. To tighten or adjust a length of the harness 102, the example harness 102 employs a tightening member 120. The tightening member 120 of the harness 102 is schematically illustrated in FIG. 9 and can include a ratchet mechanism, a cam buckle, a pair of rings, and/or any means for tightening or adjusting the length of the harness 102.

Figure 11:
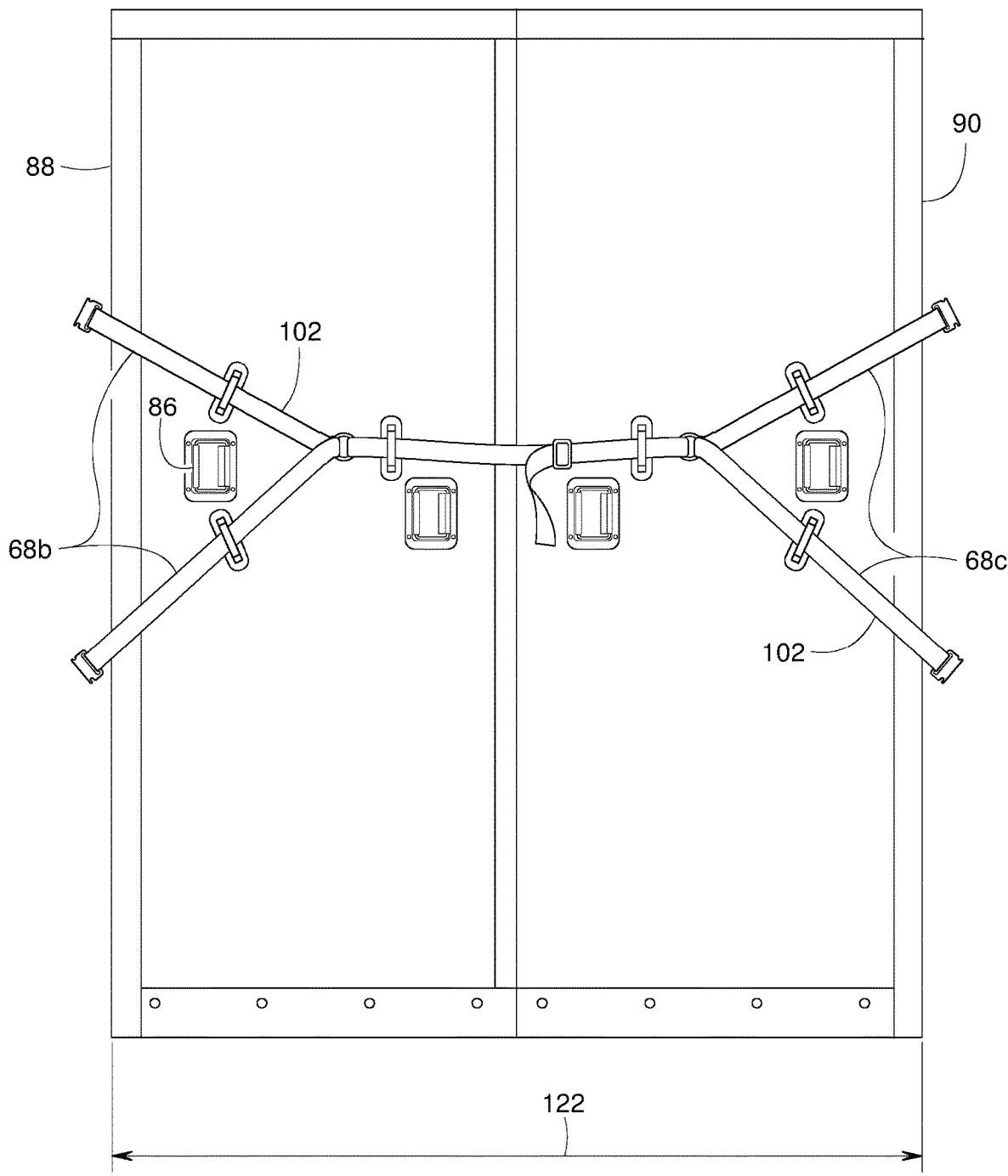
FIG. 11 is a front view similar to FIG. 9 but showing an example harness of the example bulkhead in an example extended configuration.

FIG. 9 shows the bulkhead 34 unattached from the cargo transporter 10 with the ends 106, 108, 110 and 112 of the harness 102 hanging relatively limp from fasteners 116. FIG. 10 shows the bulkhead 34 partially folded at the hinge 78 in preparation for moving the bulkhead 34 to a location within the cargo storage area 16. FIG. 11 shows how the branches 68b and 68c extend out past the lateral edges 88 and 90 and beyond a partition width 122 of the bulkhead 34 to enable the clips 66 to reach and connect to the retaining tracks 64. FIG. 12 shows the clips 66 fastening the harness 102 to the retaining tracks 64. When connected to the retaining tracks 64, the harness 102 can be tightened and secured using the tightening member 120. Tension 124 in the middle section 68a of the harness 102 is transmitted to both pairs of branches 68b and 68c, which enables tightening of (e.g., all four) ends 106, 108, 112, 114 concurrently with adjustment of a single tightening member 120.

In some examples, the straps 68 of each branch 68b and 68c diverge at acute angles 126a and 126b. The flexibility of the straps 68 makes the angles 126a and 126b adjustable. This in combination with the location of the fasteners 116 make the harness 102 readily connectable to retaining tracks 64 that may be mounted at a range of different heights. Thus, the bulkhead 34 with harness 102 demonstrates flexible utility and reliable performance across various cargo transporter configurations.

To prevent the bulkhead 34 from being damaged should the harness 102 be accidentally snagged and pulled from partition 84 (e.g., by a forklift or other loading machinery), some examples of the harness 102 include one or more breakaway sections 128 that can restorably separate from the partition 84 without permanent damage. The breakaway mechanism is designed to separate due to a force greater than what would generally be experienced during usual transport and/or loading/unloading conditions, but less than what would cause damage to the partition 84. In some examples, the breakaway section 128 includes one or more portions or segments of the harness 102. In the example shown in FIG. 13, the breakaway section 128 is the entire harness 102 itself.

Figure 13:
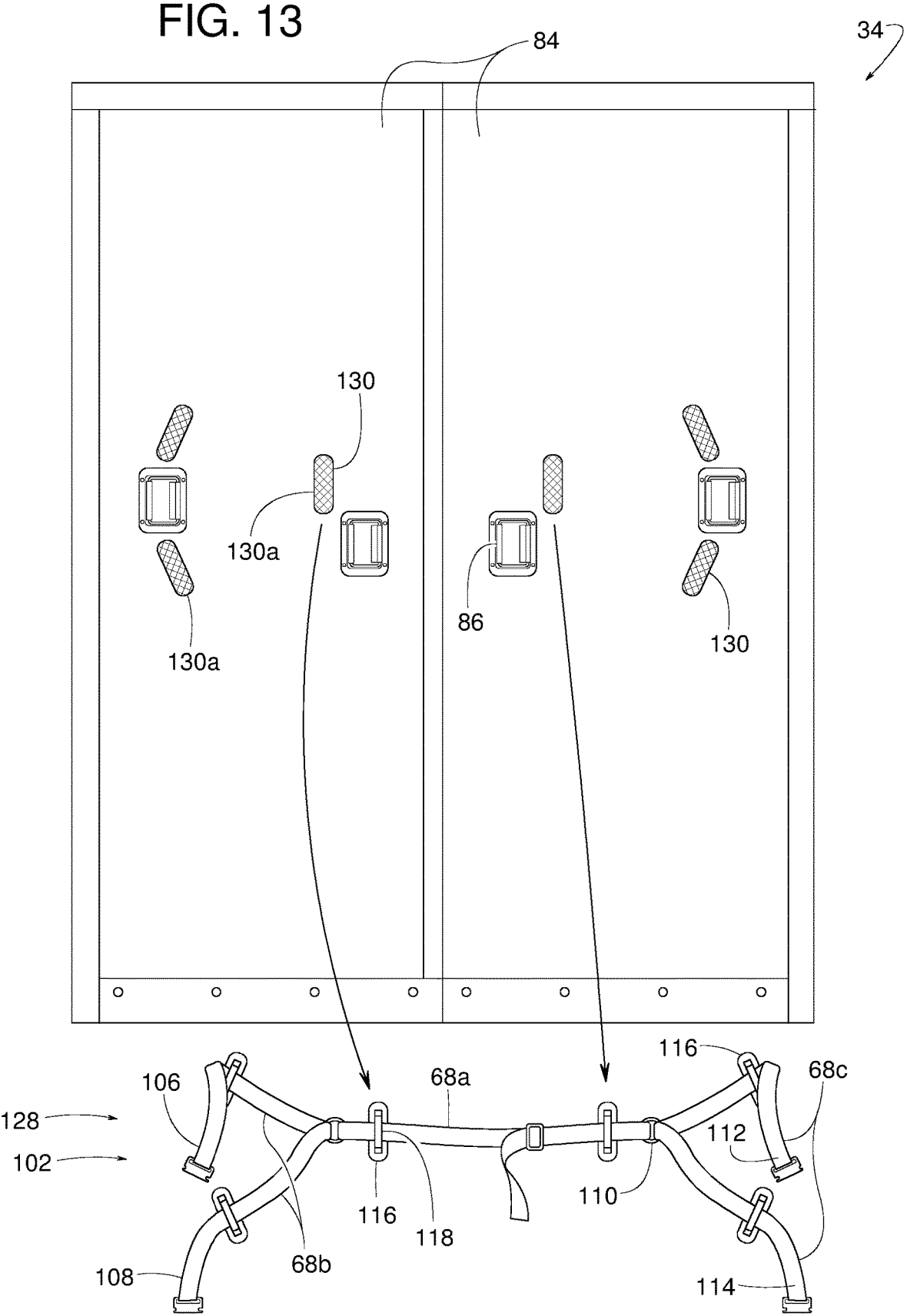
FIG. 13 is a front view similar to FIG. 9 but showing the example harness in an example restorable breakaway configuration.

In the example of FIG. 13, the fasteners 116 provide a releasable connection between the harness 102 and the partition 84. FIG. 13 shows the fasteners 116 of the harness 102 decoupled from the partition 84 such that the bulkhead 34 is in a restorable breakaway configuration. As shown in FIGS. 9-12, when the fasteners 116 couple the harness 102 to the partition 84, the bulkhead 34 is in an operative configuration. In some examples, restorable breakaway function is enabled by the fasteners 116. Some examples of the fastener 116 that enable a restorable breakaway function include a touch-and-hold fastener 130 (FIGS. 13-15), a magnet 132 (FIGS. 16 and 17), and a resiliently releasable feature 134 (FIGS. 18 and 19).

Figure 14:
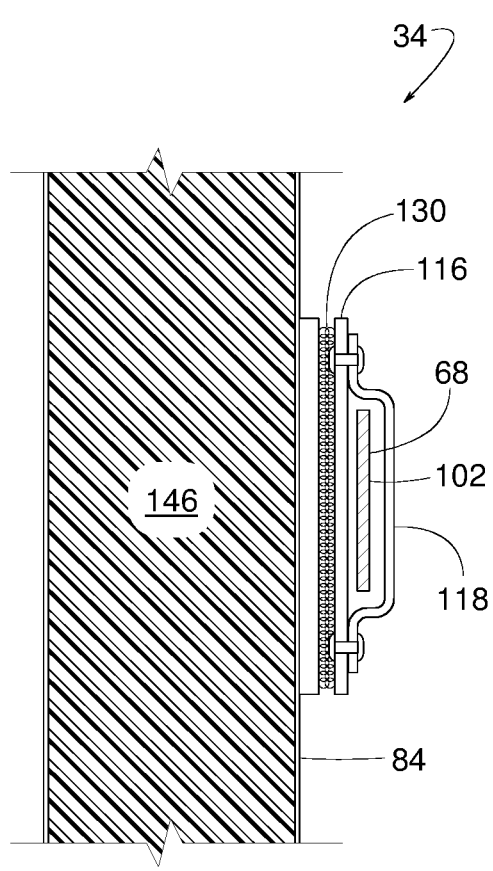
FIG. 14 is a cross-sectional view taken along line 14-14 of FIG. 10 and showing an example harness and loop assembly disclosed herein.
Figure 15:
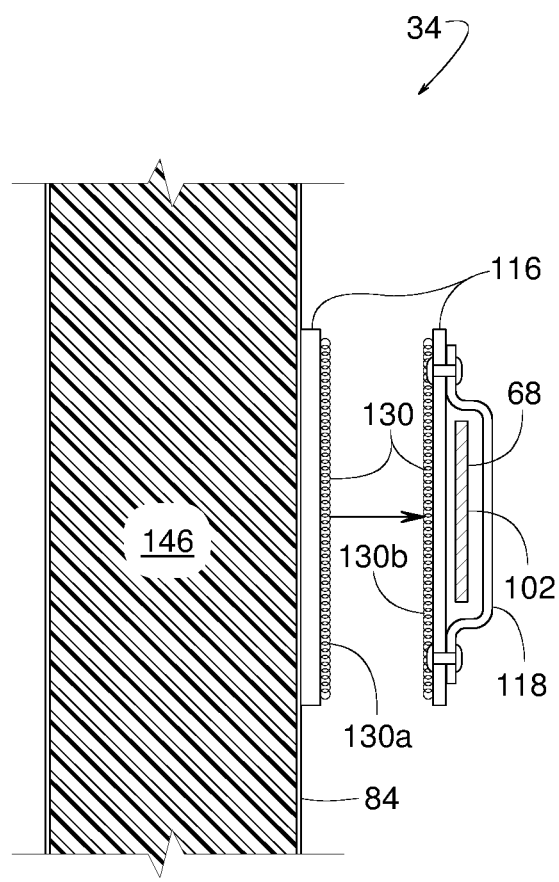
FIG. 15 is a cross-sectional view similar to FIG. 14 but showing an example harness of the harness and loop assembly in an example restorable breakaway configuration.

In the example shown in FIGS. 13-15, the fastener 116 includes the touch-and-hold fastener 130 (e.g., a hook-and-loop fastener, VELCRO, interlocking matrix of mushroom heads, etc.). In this example, an affixed part 130a of the touch-and-hold fastener 130 is bonded, sewn, thermally welded, or otherwise attached to the partition 84 while a removable mating part 130b of the touch-and-hold fastener 130 is attached to the loop 118. FIG. 14 shows a cross-section of the bulkhead 34 in the operative configuration, and FIG. 15 shows a cross-section of the bulkhead 34 in the restorable breakaway configuration.

Figure 16:
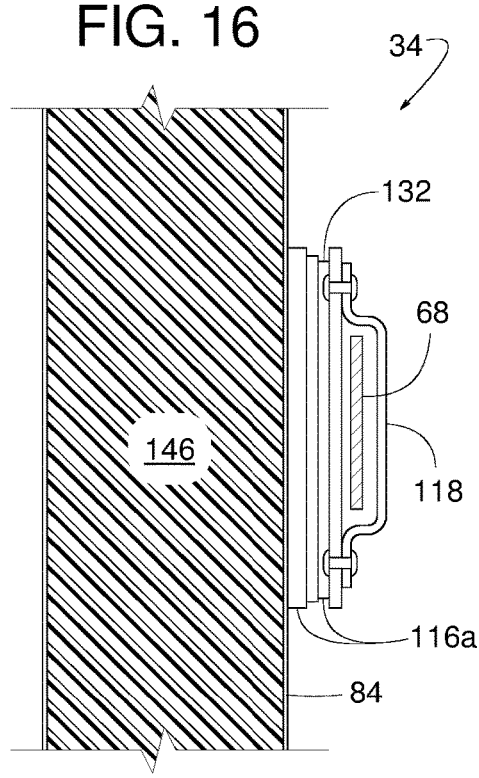
FIG. 16 is a cross-sectional view similar to FIG. 14 but showing another example harness and loop assembly disclosed herein.
Figure 17:
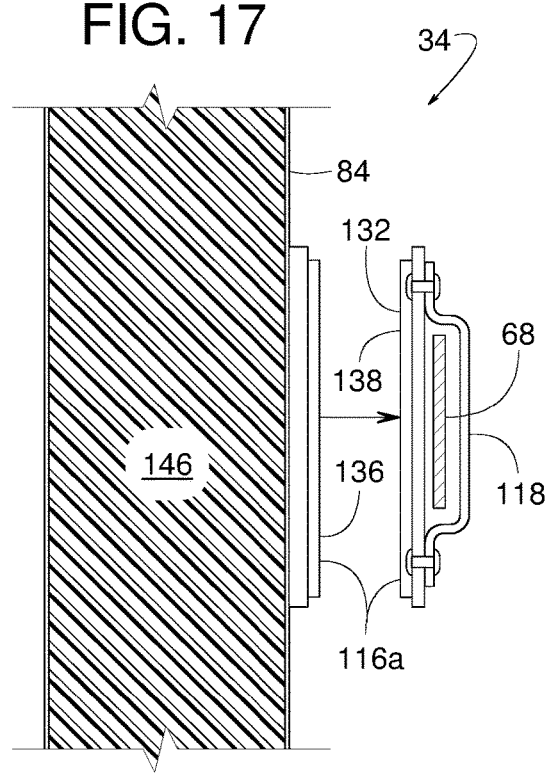
FIG. 17 is a cross-sectional view similar to FIG. 16 but showing an example harness of the example harness and loop assembly in an example restorable breakaway configuration.

In the example shown in FIGS. 16 and 17, the fastener 116a includes (e.g., two) magnetically attracted parts, an affixed part 136 and a removable part 138. The affixed part 136 is bonded, sewn, thermally welded, or otherwise attached to the partition 84, and the removable part 138 is attached to the loop 118. FIG. 16 shows the bulkhead 34 in the operative configuration, and FIG. 17 shows the bulkhead 34 in the restorable breakaway configuration.

Figure 18:
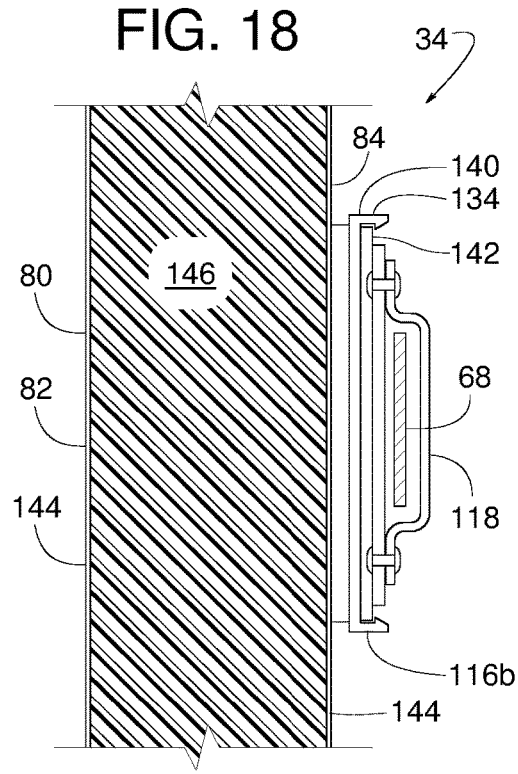
FIG. 18 is a cross-sectional view similar to FIGS. 14 and 16 but showing another example harness and loop assembly disclosed herein.
Figure 19:
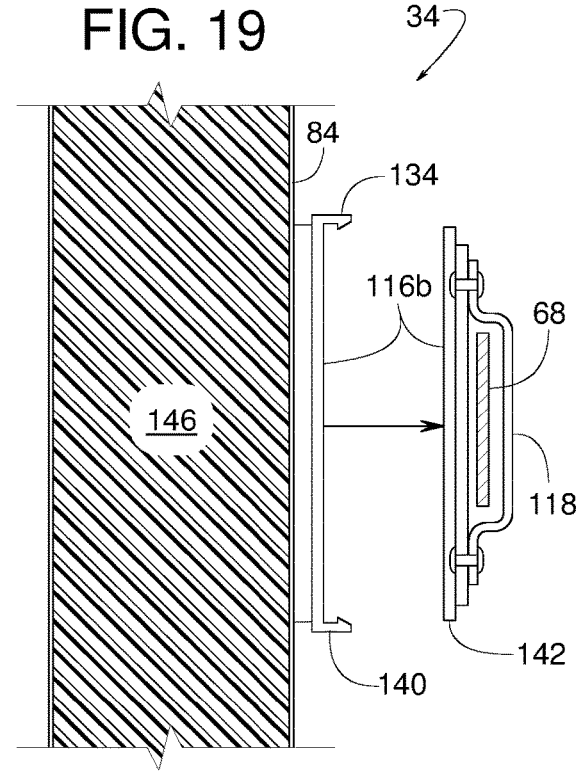
FIG. 19 is a cross-sectional view similar to FIG. 18 but showing an example harness of the example harness and loop assembly in an example restorable breakaway configuration.

In the example shown in FIGS. 18 and 19, the fastener 116 is in the form of a resiliently releasable fastener 116b that includes an affixed part 140 and a removable part 142. The affixed part 140 is bonded, sewn, thermally welded, or otherwise attached to the partition 84, and the removable part 142 is attached to the loop 118. The resiliently releasable feature 134 (e.g., a snap, a clip, an interference fit, etc.) allows the restorable separation of the parts 140 and 142. FIG. 18 shows the bulkhead 34 in the operative configuration, and FIG. 19 shows the bulkhead 34 in the restorable breakaway configuration.

FIGS. 18-19 also illustrate some construction details of the panels 80 and 82. In some examples, the panels 80 and 82 include a cover sheet 144 overlying a foam core 146. The foam core 146 provides each panel 80 and 82 with structural stiffness, resilience, thermal insulation, and/or reduced (e.g., minimal) weight. In particular, the material properties of the example panels 80, 82 enable the partition to maintain a generally flat planar shape when supported primarily by the floor, absorb an impact without breaking, reduce (e.g., minimize) thermal conduction through the panel, and have a relatively low mass for maneuverability. In some examples, the foam core 146 includes Arcel foam with a thickness of 2.5 inches. In other examples, the foam core is less than 3 inches thick.

The cover sheet 144 provides moisture resistance, abrasion resistance, an ability to sanitize (e.g., wash down), and/or a clean appearance. Some example materials of the foam core 146 can include expanded polystyrene foam, closed-cell polyethylene, extruded polystyrene foam, and/or any other suitable material(s). Some example materials of the cover sheet 144 can include vinyl sheeting, vinyl fabric, polyester sheeting, polyester fabric, and/or any other suitable material(s). In some examples, the cover sheet 144 weighs about 18 ounces per square-yard. In some examples, the cover sheet 144 can be adhesively or thermally bonded to the foam core 146.

In some examples, the panels 80 and 82 and their vertically elongate seals 96 (e.g., vertically elongate seals 96a, 96b, 96c, and 96d) are constructed as shown in FIGS. 20-24.

Figure 20:
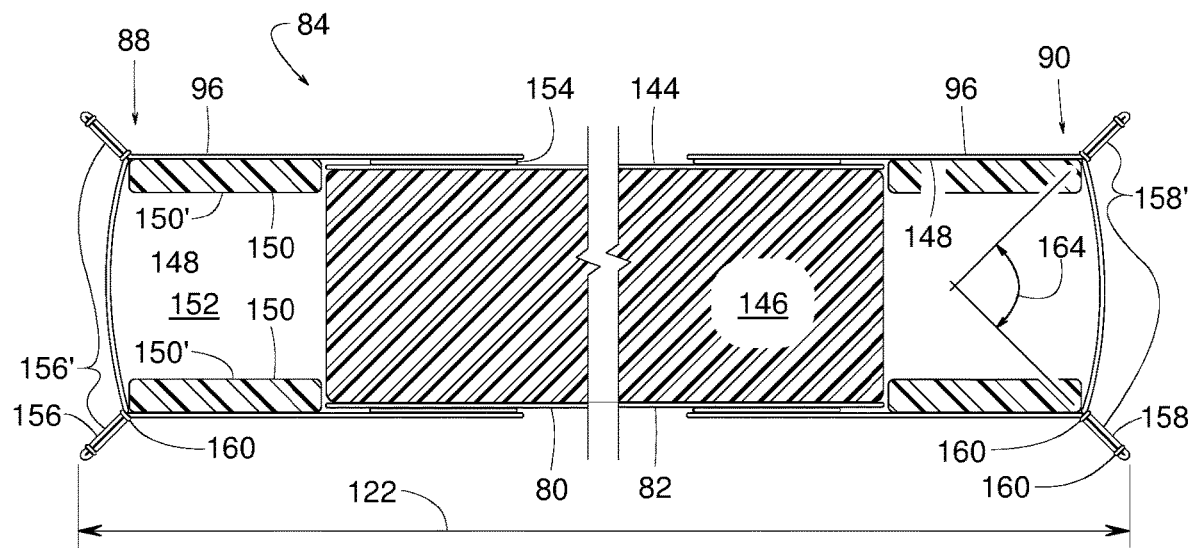
FIG. 20 is a cross-sectional view taken along line 20-20 of FIG. 9.
Figure 21:
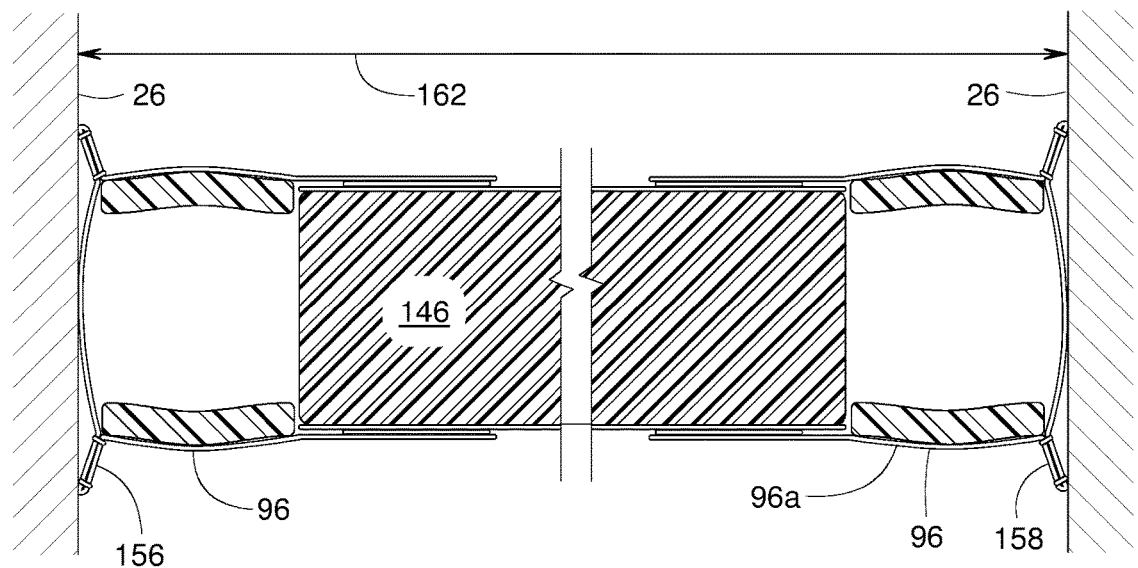
FIG. 21 is a cross-sectional view taken along line 21-21 of FIG. 12.

In the example shown in FIGS. 20 and 21, each seal 96 includes a cover sheet 148 over a foam core 150. In some examples, the foam core 150 includes two foam pads 150' that are spaced apart from each other to define a void 152 therebetween. The foam pads 150' illustrated have a rectangular cross-section, however, foam pads 150' with non-rectangular cross-sectional geometries can be implemented (e.g., triangular). The void 152 provides the seal 96 with more flexibility and compliance than if the foam core 150 were a solid block of foam with no void. In some examples, the foam core 150 has a base portion connecting the two foam pads 150' adjacent the panel edge while maintaining the void 152 along the sealing edge. This configuration provides additional surface area for bonding the foam core to the panel. The example seal 96 illustrated in FIG. 20 has a generally rectangular cross-section, however, seals with non-rectangular cross-sectional geometries can be implemented (e.g., triangular, a shape having a combination of straight and curved sides, etc.).

For seal 96, some example materials of the foam core 150 can include open-cell polyurethane foam, closed-cell polyurethane foam, open-cell polyester foam, and/or any other suitable material(s). In some examples, the seal's foam core 150 is more resiliently compressible/deformable (i.e., softer) than the foam core 146 of the panel 80, 82. A softer foam provides a more compliant or flexible seal capable of accommodating irregularities like the retaining tracks 64 in the surface to/along which it is intended to seal, while less resiliently compressible/deformable (i.e., harder) foam provides structural rigidity.

Some example materials of the seal's cover sheet 148 can include vinyl sheeting, vinyl fabric, polyester sheeting, polyester fabric, and/or any other suitable material(s). The seal's cover sheet 148 can be coupled to the panel's cover sheet 144 at attachments 154, schematically illustrated to represent any type of attachment. Some example attachments 154 include adhesive, thermal bonding, sewing, and/or touch-and-hold fasteners. In some examples, a releaseable version of the attachment 154 can be utilized to facilitate replacement of worn or damaged seals or panels. A releasable version of attachment 154 can include one in which the cover sheet 148 of the seal 96 and the cover sheet 144 of the panel 80, 82 can be separated without causing damage to at least one of the cover sheets 148, 144.

Some examples of the partition 84 include a lip seal positioned at an edge of the panel 80, 82. FIG. 20 illustrates a first lip seal 156 positioned along the first lateral edge 88 of the first panel 80 and a second lip seal 158 along the second lateral edge 90 of the second panel 82. In some examples, the lip seals 156 and 158 are made of folded-over sections of the cover sheet 148 of the seal 96. Sewn seams 160 running (e.g., vertically) lengthwise along the panel edges 88 and 90 maintain the outwardly protruding shape of the lip seals 156 and 158. It should be noted that sewn seams 160 are schematically illustrated to represent any type of joining, some examples of which include gluing, thermal welding, fastening, etc.

The lip seals 156 and 158 of the illustrated example have a relaxed state (FIG. 20) and a deflected state (FIG. 21). The partition 84, when secured between a trailer's side walls 26, forces the lip seals 156 and 158 to deflect from the relaxed state to the deflected state. The first lip seal 156 and the second lip seal 158 define a first width 122 therebetween when in the relaxed state. The first lip seal 156 and the second lip seal 158 define a second width 162 therebetween when in the deflected state. The first width 122 is greater than the second width 162.

In some examples, the first lip seal 156 is one of a first pair of lip seals 156' disposed along the first lateral edge 88, and the second lip seal 158 is one of a second pair of lip seals 158' disposed along second lateral edge 90. Each pair of lip seals 156' and 158' extend from the seal 96 to define an acute angle 164 therebetween.

Figure 35:
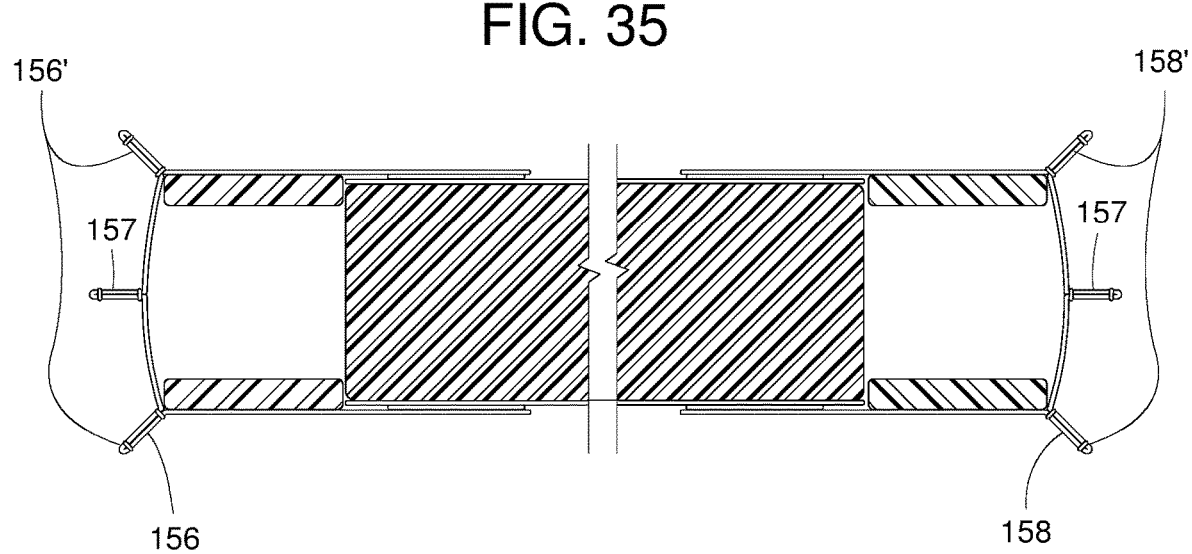
FIG. 35 is a cross-sectional view similar to FIG. 20 but showing another example bulkhead disclosed herein.

In some examples, as shown in FIG. 35, one or more central lip seals 157 are interposed between each pair of lip seals 156' and 158'. In some examples, the construction of central lip seals 157 are similar to that of lip seals 156 and 158.

Figure 22:
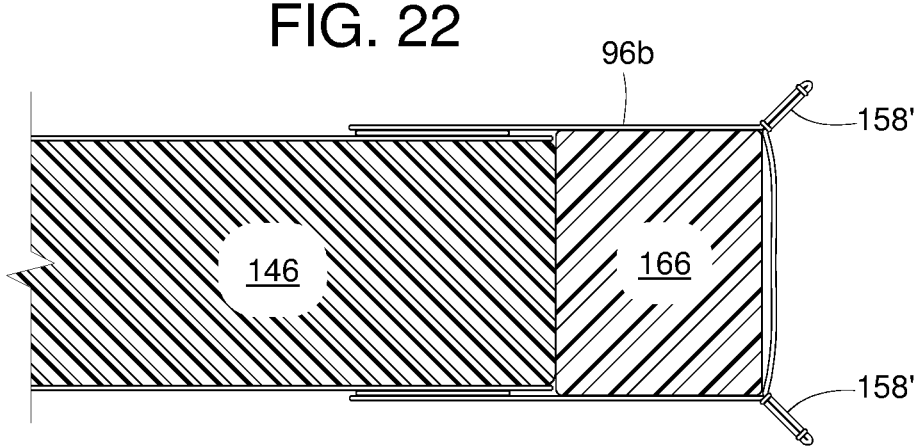
FIG. 22 is a cross-sectional view similar to the right side of FIG. 20 but showing another example side seal disclosed herein.

FIG. 22 shows the example side seal 96b that is similar to the side seal 96a. However, instead of two foam pads 150' and the void 152, as shown in FIGS. 21 and 22, the side seal 96b of FIG. 22 includes a single block of foam 166 having a generally rectangular cross-section. Alternatively, the block of foam could have a non-rectangular cross-section (e.g., triangular cross-section, a shape having a combination of straight and curved sides, etc.). The example of FIG. 22 has a pair of lip seals 158'. Alternatively, side seal 96b could have any number of side seals. In some examples, the lip seal can be omitted from side seal 96b.

Figure 23:
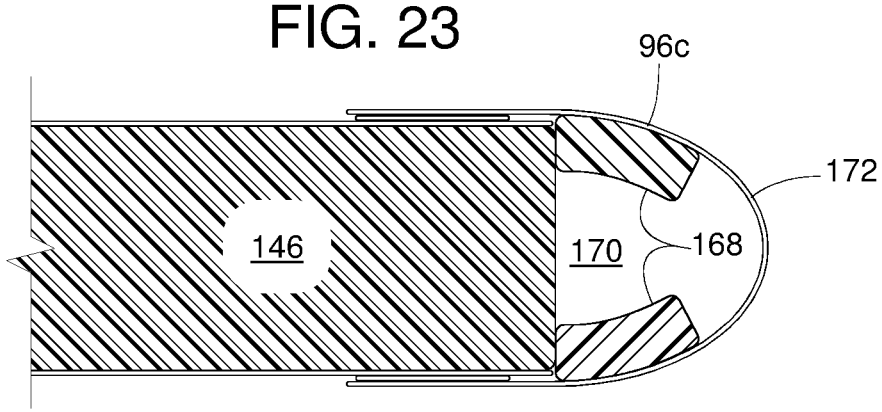
FIG. 23 is a cross-sectional view similar to FIG. 22 but showing another example side seal disclosed herein.

FIG. 23 shows another example side seal 96c similar to the side seal 96a. In this example, the side seal 96c includes two spaced-apart foam pads 168 to define a void 170 therebetween. However, instead of the cover sheet 148 being formed to provide the lip seals 156 and 158, as shown in FIGS. 20 and 21, a cover sheet 172 of the side seal 96c wraps over the foam pads 168 and the void 170 such that seal 96c has a non-rectangular cross-sectional shape.

Figure 24:
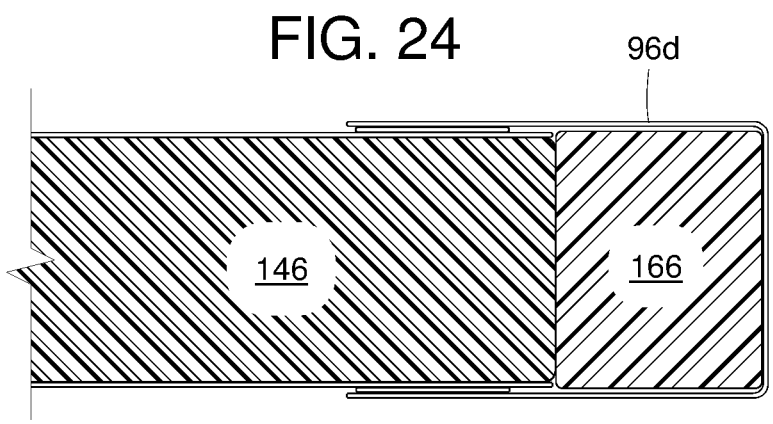
FIG. 24 is a cross-sectional view similar to FIGS. 22 and 23 but showing another example side seal disclosed herein.

FIG. 24 shows a side seal 96d similar to the side seal 96b of FIG. 22. The side seal 96d, however, does not include the lip seals 158'.

Figure 25:
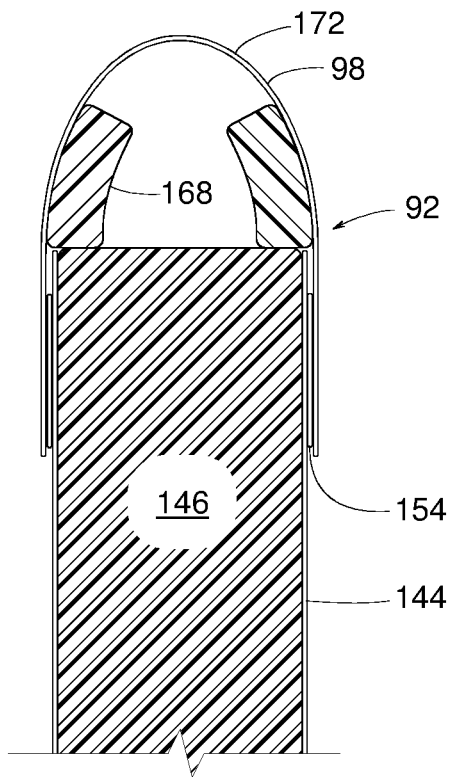
FIG. 25 is a cross-sectional view taken along line 25-25 of FIG. 9.
Figure 26:
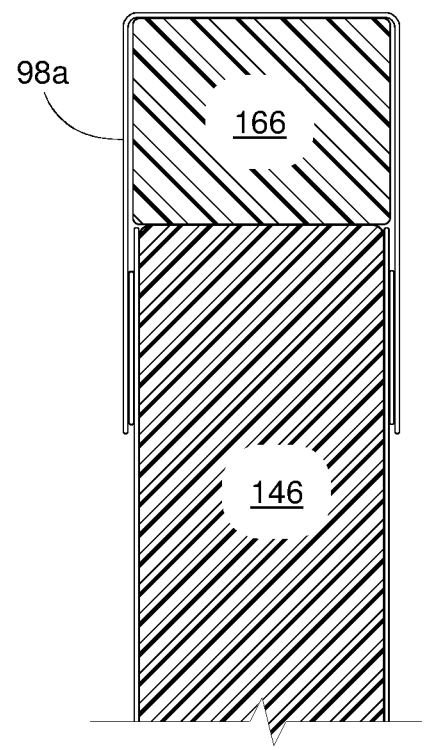
FIG. 26 is a cross-sectional view similar to FIG. 25 but showing another example upper seal disclosed herein.

Any of the side seals 96a-d can also be used as a horizontally elongate seal 98 along the partition's upper edge 92. FIGS. 25 and 26, for instance, show example horizontally elongate seals 98 and 98a that are structurally identical to the side seals 96c and 96d respectively.

Figure 27:
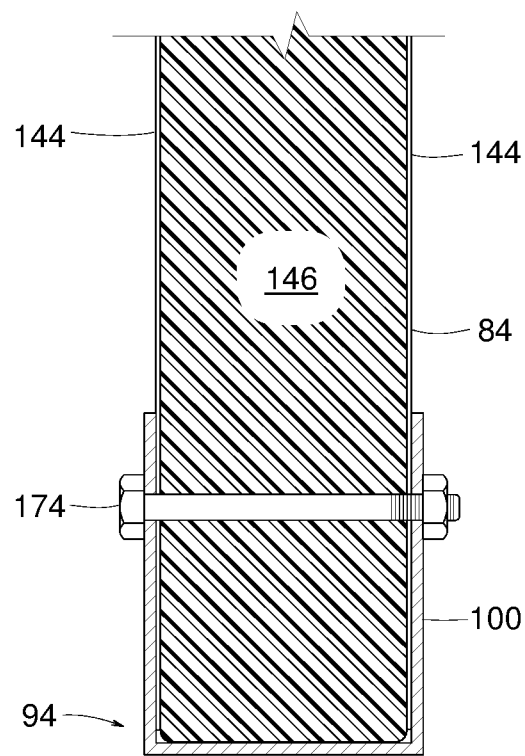
FIG. 27 is a cross-sectional view taken along line 27-27 of FIG. 9.

FIG. 27 shows a cross-sectional end view of a reinforcement material layer 100 along the partition's lower edge 94. In some examples, a fastener 174 holds the reinforcement layer 100 to the partition 84. Some example materials of the reinforcement layer 100 can include UHMW (ultra high molecular weight polyethylene), HMWPE (high molecular weight polyethylene), nylon, acetal, and/or any other suitable material(s). As shown in FIG. 27, the reinforcement layer 100 can be in the shape of a channel.

Figure 28:
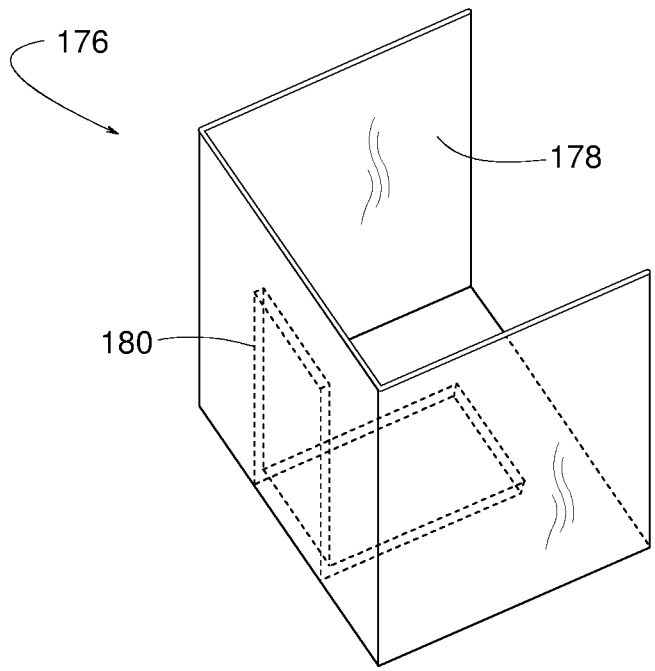
FIG. 28 is a perspective view of an example corner reinforcement disclosed herein.

Some examples of the bulkhead 34 have one or more outer corners of the panels 80 and 82 reinforced by a durable corner reinforcement 176, as shown in FIG. 28. In some examples, the corner reinforcement 176 is a durable sheet of material 178 cut and folded to the general shape shown in FIG. 28. In some examples, a rigid or semi-rigid L-shaped piece 180 can be integrated into the corner reinforcement 176 (e.g., sewn, bonded, or otherwise attached to or held in place by the durable sheet of material 178). The corner reinforcement 176 can be coupled to corners of the panels 80 and 82 via thermal welding, bonding, fastening, etc.

Figure 29:
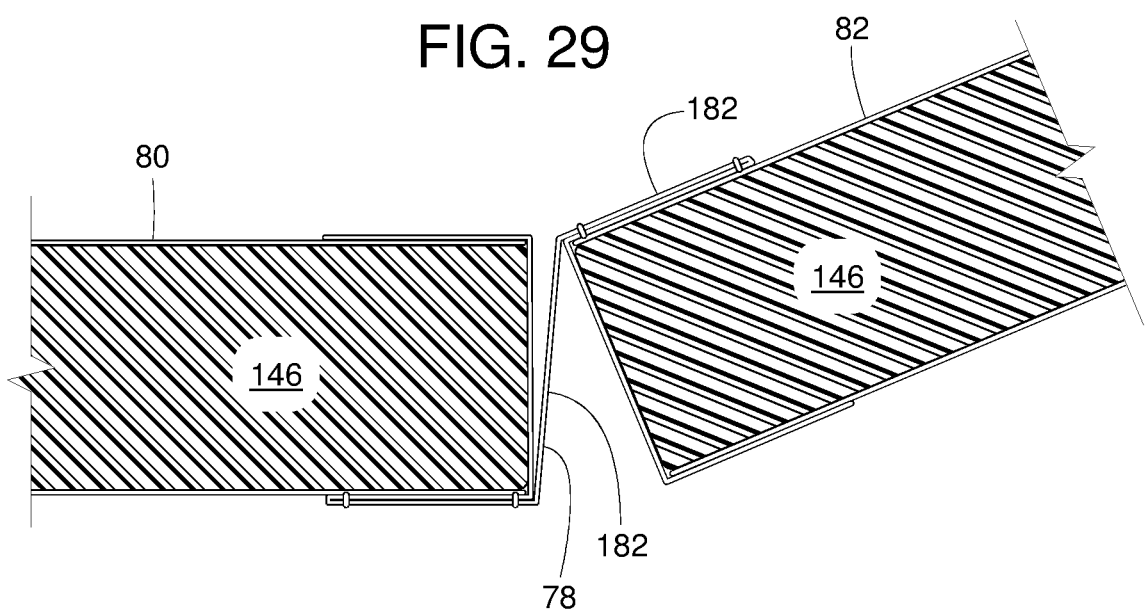
FIG. 29 is a cross-sectional view taken along line 29-29 of FIG. 10.

FIG. 29 shows an example of a hinge 78. In this example, the hinge 78 is made of a single sheet of material 182 folded and fastened (e.g., sewn, glued, touch-and-hold fastener, thermal welded, etc.), as shown, and attached to the adjacent edges of panels 80 and 82. In some examples, hinge 78 can include multiple separate sheets of material assembled and fastened to the panel.

FIGS. 30-32 show examples of a handle 86 that can be used to (e.g., manually) reposition the bulkhead 34. In some examples, each of a pair of handles 86 are positioned at offset (i.e., different) vertical and/or horizontal dimensions with respect to the edges of the partition, which improves ergonomics involved in positioning the bulkhead. In some examples, one handle 86 can be positioned closer to the upper edge 92 than compared to the lower edge 94. Alternatively or in addition, one handle 86 can be positioned closer to the upper edge 92 than compared to another handle 86. In some examples, a handle 86 can be positioned at a non-zero angle with respect to another handle 86 or with respect to the lateral edge 88, 90.

In the illustrated examples, the handle 86 is disposed within a handle receptacle 184, and each handle receptacle 184 is recessed within the foam core 146 of panel 80 or 82. The handle 86 and the handle receptacle 148 are at least partially recessed relative to an outer facing surface 186 of the panel 80, 82. In some examples, all or most of the thickness of the handle can be disposed within the thickness of the panel 80, 82.

In some examples, the handle 86 moves between a stored position (FIGS. 30 and 32) and an operative position (FIG. 31). In some examples, a bias element 186 (e.g., spring) can urge the handle 86 to a stored position, so the handle 86 is less likely to interfere with other loading/unloading operations when not in use.

In some examples, the handle receptacles 184 include an outer peripheral flange 188 that overlays at least part of the cover sheet 144 to provide a clean appearance and/or to secure the edges of the cover sheet 144 in the area around the handle receptacle 184. In some examples, the handle receptacle 184 can be secured by a fastener 190 that extends through the flange 188, the cover sheet 144, and the foam core 146. In the example shown in FIGS. 30 and 31, a metal washer 192 provides reinforcement underneath a nut 194 of the fastener 190.

In the example shown in FIG. 32, the nut 194 of FIGS. 30 and 31 is replaced by a barbed T-nut 196, and a rigid or semi-rigid sheet of material 198 (e.g., UHMW) replaces washer 192. In some examples, the cover sheet 144 overlays the T-nut 196 and the plastic sheet 198 to reduce or eliminate surface irregularities where harborage can occur and to create a thermal break that can reduce or eliminate the accumulation of frost or condensation on the outer peripheral flange 188.

Figure 33:
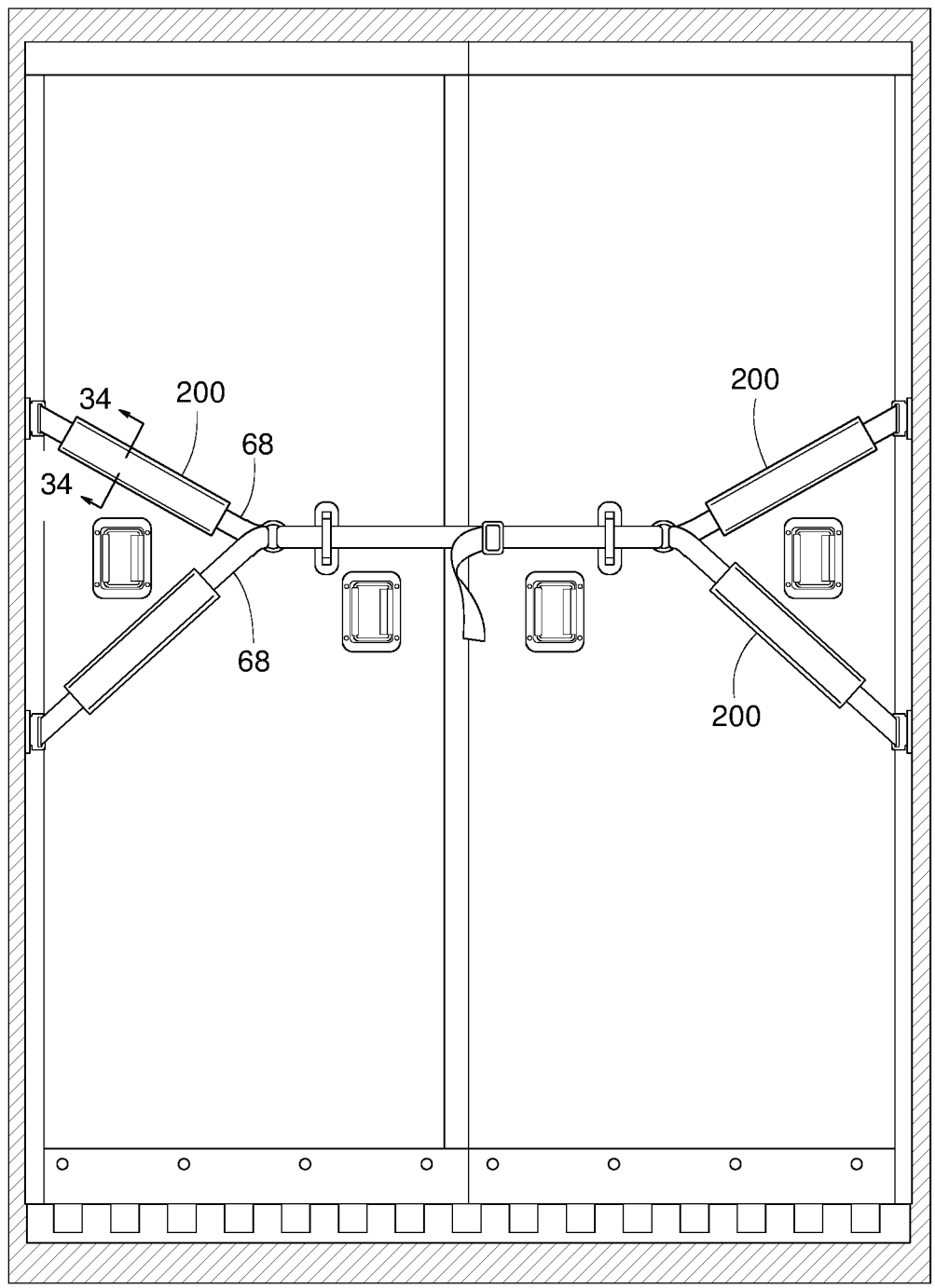
FIG. 33 is a cross-sectional view similar to FIG. 12 but showing another example bulkhead disclosed herein.
Figure 34:
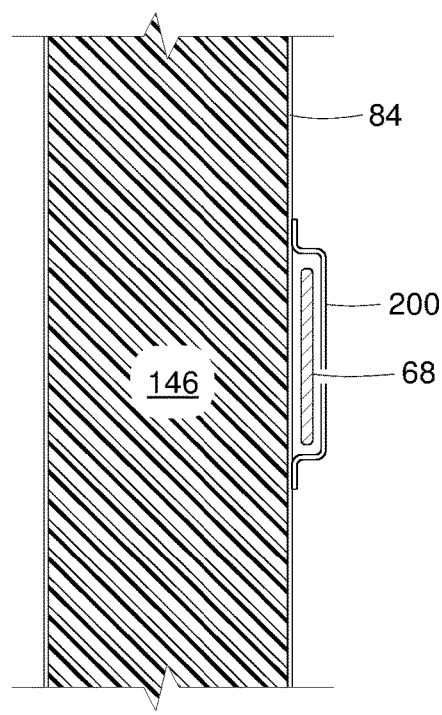
FIG. 34 is a cross-sectional view taken along line 34-34 of FIG. 33.

In the example shown in FIGS. 33 and 34, one or more sheets of material 200 overlay one or more straps 68 as an alternative to the fasteners 116 of FIGS. 6 and 9-19. Example means for attaching sheets 200 to partition 84 include touch-and-hold fasteners, adhesive, thermal welding, sewing, etc. When attached to partition 84, sheets 200 create a protective sleeve that reducing the likelihood of straps 68 getting snagged or damaged. In some examples, sheets 200 are made of vinyl fabric.

FIGS. 36-41 illustrate another example bulkhead 300 disclosed herein. Many of the components of the example bulkhead 300 of FIGS. 36-41 are substantially similar or identical to the components described above in connection with the bulkhead 34 of FIGS. 1-35. As such, those components will not be described in detail again below. Instead, the interested reader is referred to the above corresponding descriptions for a complete written description of the structure and operation of such components. To facilitate this process, similar or identical reference numbers will be used for like structures in FIGS. 36-41 as used in FIGS. 1-35.

Figure 36:
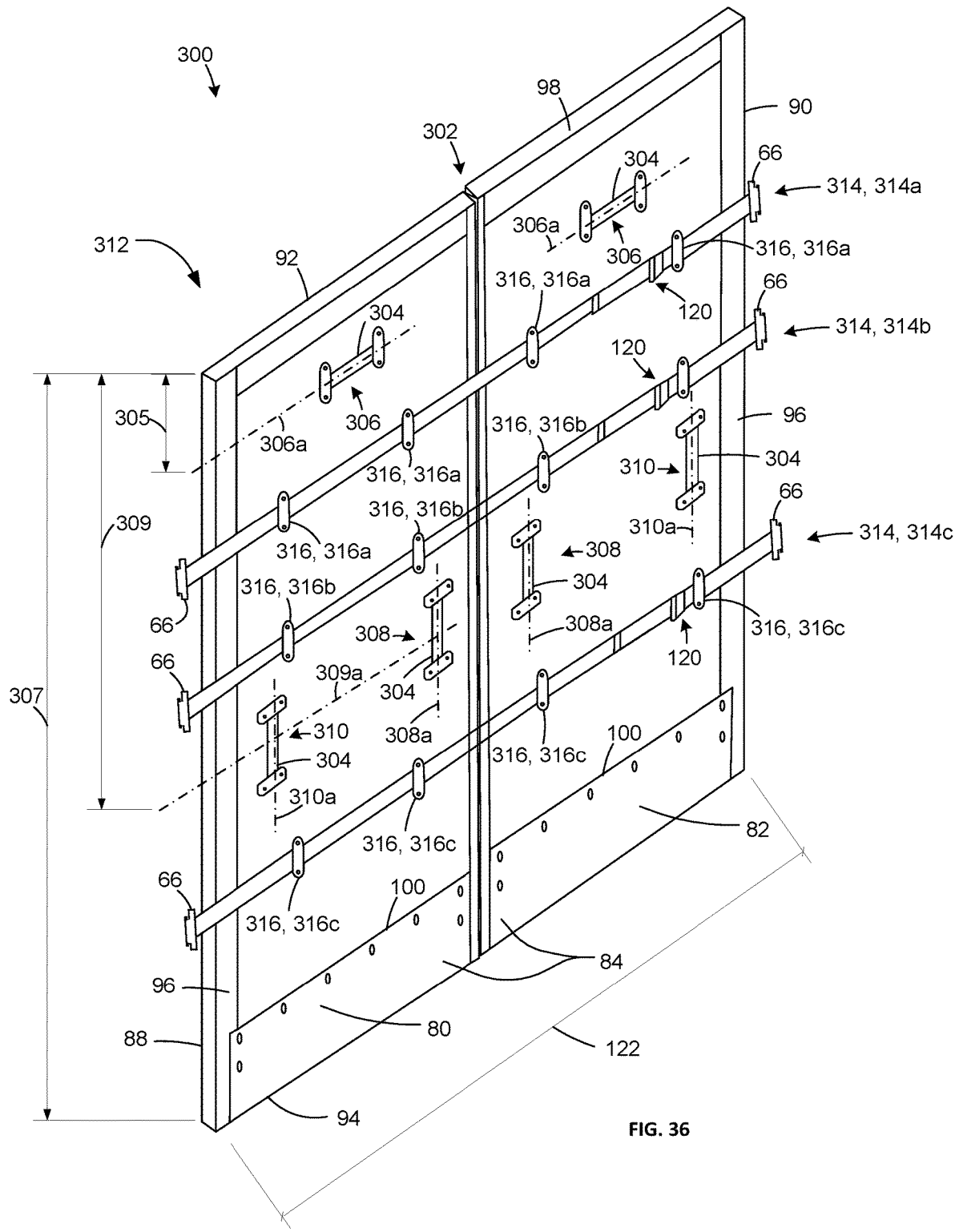
FIG. 36 is a perspective view of another example bulkhead disclosed herein.
Figure 37:
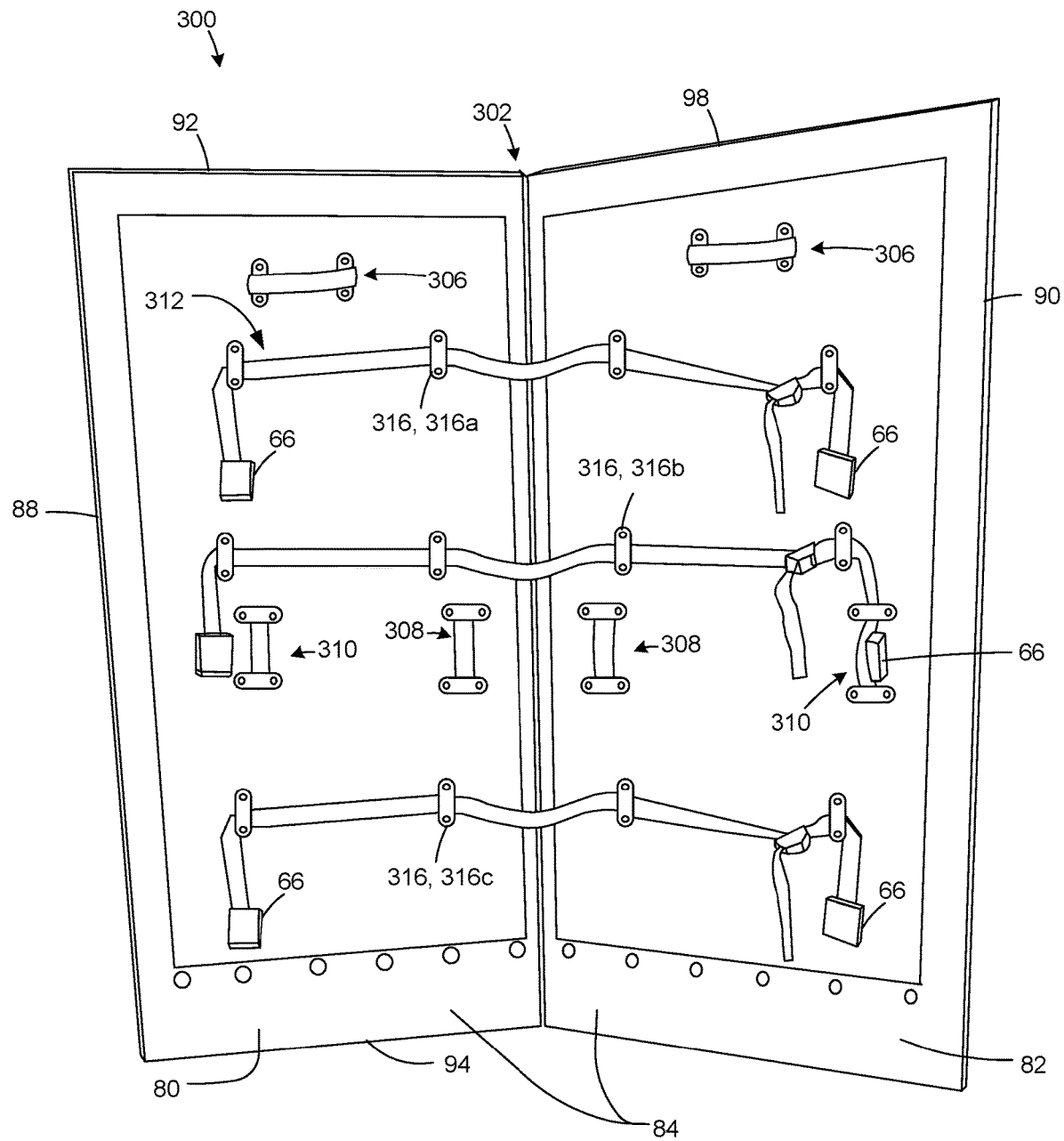
FIG. 37 is a perspective, front view of the bulkhead of FIG. 36 shown in a detached and partially folded condition.

FIG. 36 is a perspective view of the example bulkhead 300. In the illustrated example, the bulkhead 300 includes a hinge 302 coupling a first panel 80 and a second panel 82 to create a hinged partition 84. The hinge 302 enables the first and second panels 80, 82 to pivot about a generally vertical axis between a generally planar configuration (FIG. 36) and a partially folded configuration (FIG. 37). In a fully folded configuration (not shown), a first surface of the first panel 80 (e.g., front or back) is facing and adjacent to a first surface of the second panel 82 (e.g., front or back, respectively).

In the illustrated example, the partition 84 includes a first lateral edge 88 along the first panel 80, a second lateral edge 90 along the second panel 82, an upper edge 92, and a lower edge 94. In some examples, each of the panels 80, 82 and/or the partition 84 includes a vertically elongate seal 96 along each lateral edge 88 and 90, and a horizontally elongate seal 98 along the upper edge 92. Some examples of seals 96 and 98 are relatively soft and resiliently compliant to provide an effective seal between the outer periphery of the partition 84 and irregular surfaces of walls 26 and/or ceiling 18. In some examples, a durable reinforcement material layer 100 protects the lower edge 94 against wear. The partition 84 is generally in the planar configuration (FIG. 36) when the bulkhead 300 is installed and secured, dividing a cargo storage area 16 of a vehicle into separate compartments. The partition 84 is generally in the partially folded configuration (e.g., FIG. 37) or the fully folded configuration (not shown) during the process of moving or positioning the bulkhead 300 or when it is set aside or stored more compactly when not in use.

To facilitate positioning of the bulkhead 300 inside the cargo storage area 16, each of the first panel 80 and the second panel 82 includes one or more handles 304. The first panel 80 and the second panel 82 of the illustrated example each includes a first handle 306 and a second handle 308. The first handle 306 is positioned adjacent the upper edge 92 of the panel 80, 82. For example, the first handle 306 of the illustrated example is a horizontal handle. Specifically, the first handle 306 of the illustrated example includes a longitudinal axis 306a that is substantially parallel relative to the upper edge 92. Additionally, the second handle 308 of the illustrated example is a vertical handle. For example, the second handle 308 of the illustrated example includes a longitudinal axis 308a that is substantially parallel relative to the lateral edges 88, 90. In the illustrated example, each of the first panel 80 and the second panel 82 includes a third handle 310. The third handle 310 is spaced from the second handle 308. For instance, the second handle 308 of each panel 80, 82 is located adjacent the hinge 302 and the third handle 310 of each panel 80, 82 is located adjacent the respective lateral sides 88, 90. As used herein, substantially parallel means perfectly parallel or within 10 degrees of perfectly parallel.

The first handle 306 of the illustrated example facilitates and/or improves ergonomic characteristics of the bulkhead 300. As illustrated, the longitudinal axis 306a of the first handle 306 is rotationally oriented out of parallel from the longitudinal axes 308a, 310a of the second and third handles 308, 310. Additionally, the first handle 306 is translationally offset a distance (e.g., a non-zero distance) from each of the second and third axes 308a, 310a as well as from an axis 309a that intersects the second and third handles 308, 310. This enables a user to easily manipulate the panels and the partition around both vertical and horizontal axes within a cargo space (e.g., the cargo space 16). The first handle 306 is positioned adjacent the upper edge 92. Specifically, the first handle 306 is spaced a distance 305 from the upper edge 92. In some examples, the distance 305 can be between approximately one foot and three feet. In some examples, the distance 305 can be between approximately 15 percent and 35 percent of an overall height 307 of the partition 84 (e.g., the first panel 80 and/or the second panel 82). In some examples, the second handle 308 and the third handle 310 are positioned at a distance 309 from the upper edge 92 of the partition 84, which is greater than the distance 305. In some examples, the distance 309 of the second handle 308 and the third handle 310 is approximately a midpoint of the overall height 307. In some examples, the distance 309 can be between approximately 40 percent and 60 percent of the overall height 307.

In some examples, the handles 304 can be oriented at any angle or orientation relative to the partition 84. For example, the first handle 306, the second handle 308 and/or the third handle 310 can be oriented relative to the partition 84 such that the longitudinal axes 306a, 308a and 310a of the respective first, second and third handles 306, 308 and 310 can be at a 45 degree angle or any angle between 0 degrees (e.g., a parallel orientation of the first handle 306) and 90 degrees (e.g., a perpendicular orientation of the second handle 308). In some embodiments, the longitudinal axes 308a, 310a of the second handle 308 and third handle 310 are each rotated in opposite directions (e.g., clockwise and counter clockwise, respectively) up to 45 degrees from vertical to improve ergonomics. Alternatively or in addition, in some examples, the translational position of the second handle 208 is offset from that of the third handle 310 such that they are positioned at different heights (measured vertically from the lower edge 94 of the partition). In some examples, the first handle 306 is positioned between the second handle 308 and the third handle 310 on each of the panels 80, 82.

To hold the partition 84 in position within the cargo storage area 16, the bulkhead 300 of the illustrated example includes an example harness 312. As described in greater detail below in connection with FIGS. 38A and 38B, the harness 312 of the illustrated example includes a breakaway feature. The harness 312 of the illustrated example is attached to the partition 84 (e.g., the first panel 80 and the second panel 82) and connectable to retainer tracks 64 of a cargo transporter 10. The term, "harness" refers to any configuration or assembly of one or more pliable elongate members (e.g., straps, belts, etc.) restraining or maintaining the position of the partition 84 within the cargo storage area 16. The term, "pliable" refers to any member that is sufficiently flexible to be folded back over onto itself and later unfolded without leaving the member with significant permanent damage and/or deformation.

The harness 312 of the illustrated example includes a plurality of straps 314. In the illustrated example, the partition 84 includes a first strap 314a, a second strap 314b and a third strap 314c. To couple the straps 314 to the partition 84, the bulkhead 300 of the illustrated example employs a plurality of fastener assemblies 316. For example, a first set 316a of fastener assemblies 316 couples the first strap 314a and the partition 84, a second set 316b of fastener assemblies 316 couples the second strap 314b and the partition 84, and a third set 316c of fastener assemblies 316 couples the third strap 314c and the partition 84. The fasteners 316 limit movement of the straps 314 in a direction perpendicular to the plane of the partition 84 and in a direction perpendicular relative to a longitudinal axis of the straps 314 (e.g., an up-and-down direction in the orientation of FIG. 36). Additionally, the fasteners 316 enable movement (slidable movement) of the straps 314 in a direction parallel to the plane of the partition 84, particularly along a longitudinal axis of the straps 314 (e.g., a side-to-side direction in the orientation of FIG. 36). As described in connection with FIGS. 38A and 38B, the fastener assemblies 316 of the illustrated example employ breakaway features to enable the harness 312 to detach from the first panel 80 and/or the second panel (e.g., the partition 84) without causing damage to the first panel 80 and/or the second panel 82.

The straps 314 of the illustrated example includes clips 66 at respective ends of the straps 314 to couple or connect the harness 312 to the retaining tracks 64. In the illustrated example of FIG. 36, the straps 314 extend across (e.g., horizontally across) the first panel 80 and the second panel 82. For example, each of the straps 314a-314c of the illustrated example extend (e.g., horizontally) across the partition 84 such that the clips 66 are adjacent the respective lateral edges 88, 90 of the first panel 80 and the second panel 82. The clips 66 as shown in FIG. 36 extend out past the lateral edges 88 and 90 and beyond a partition width 122 of the bulkhead 34 to enable the clips 66 to connect or couple with the retaining tracks 64. To vary or adjust (e.g., tighten or adjust a tension and/or a length of) the harness 312, the example harness 312 employs a tightening member 120. The tightening member 120 of the harness 312 can include a ratchet mechanism, a cam buckle, a pair of rings, and/or any means for tightening or adjusting the length of the harness 312.

FIG. 37 illustrates the bulkhead 300 in a detached and/or partially folded condition. For example, the bulkhead 300 and/or the partition 84 is shown detached from a cargo transporter 10 with the respective ends of the straps 314 including the clips 66 of the harness 102 hanging relatively limp from the fastener assemblies 316. Additionally, the bulkhead 300 of FIG. 37 shows the bulkhead 300 (e.g., partially) folded at the hinge 302 (e.g., in preparation for moving the bulkhead 300 to a location within the cargo storage area 16).

To move the partition 84 (e.g., within the storage space 16), a user can grasp the second handle 308 or third handle 310 of the first panel with a first hand and the second handle 308 or the third handle 310 of the second panel with a second hand to partially fold the partition 84 as shown in FIG. 37. The partition can then be slid on its lower edge (in a generally vertical orientation) to a different location inside the cargo space. Alternatively or in addition, a user can tip the top of the partition 84 forward (and/or the bottom of the partition 84 backward) using a combination of the second and/or third handles 308, 310. In a non-vertical orientation, the first handle is at an accessible height for a user to grab to more fully fold and move/drag the partition 84. Accordingly, the first handle 306 facilitates movement and/or improves characteristics of the partition 84 in comparison with a bulkhead having only the second handles 308 and/or the third handles 310.

Figure 38A:
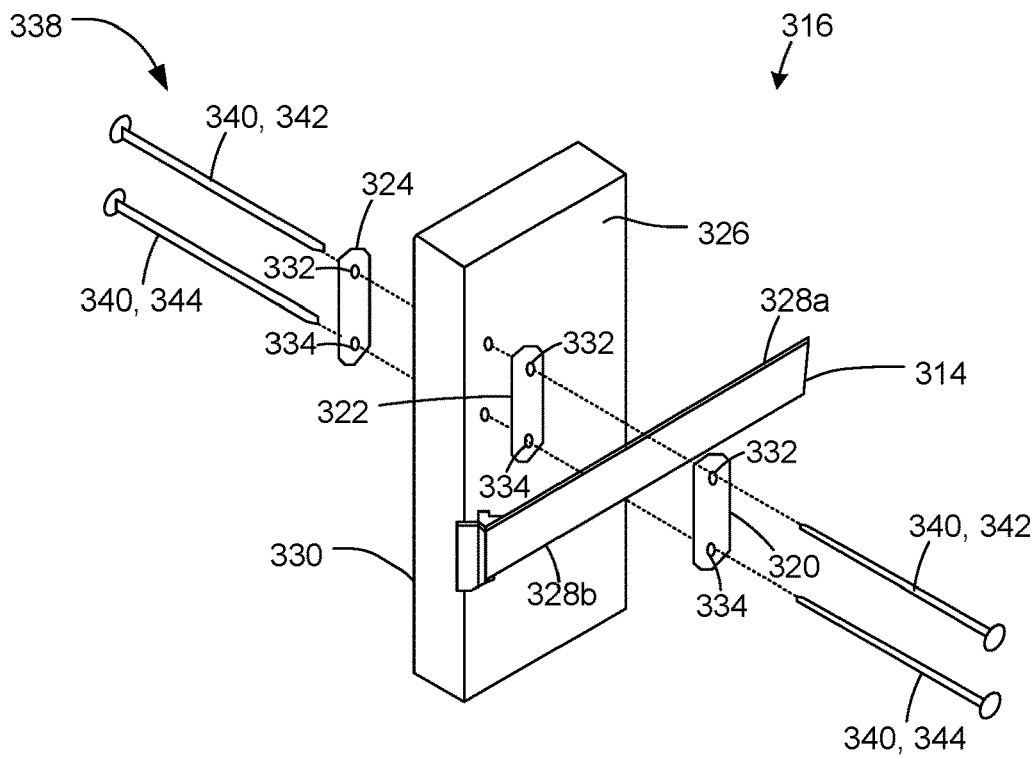
FIG. 38A is a perspective view of an example fastener assembly of the example bulkhead of FIGS. 36 and 37.
Figure 38B:
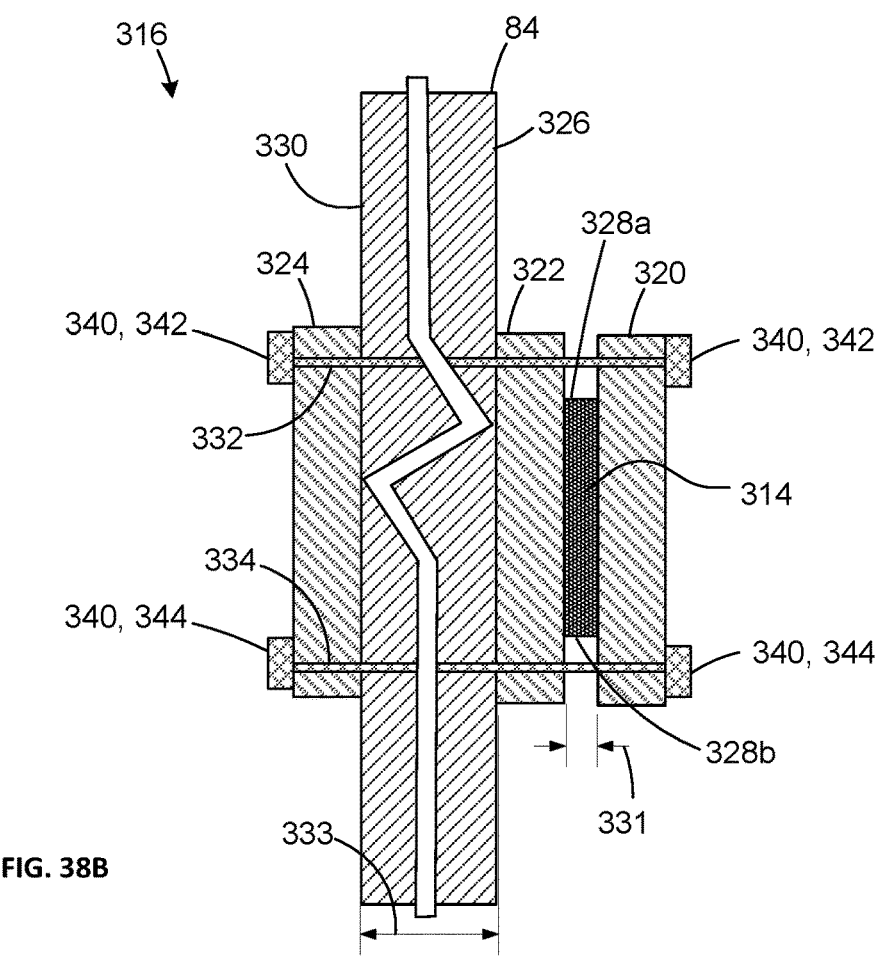
FIG. 38B is a cross-sectional side view of the example fastener assembly of FIG. 38A.

FIG. 38A is a perspective view of an example fastener assembly 316 of FIGS. 36 and 37. FIG. 38B is a cross-sectional view of the example fastener assembly 316 of FIG. 38A. The fastener assembly 316 of the illustrated example can implement each one of the example fastener assemblies 316 of FIGS. 36 and 37. Referring to FIGS. 38A and 38B, the fastener assembly 316 of the illustrated example includes a first washer 320, a second washer 322 and a third washer 324. The first washer 320 and the second washer 322 (e.g., dual washers) engage or couple the strap 314 to the partition 84. Specifically, the first washer 320 and the second washer 322 couple the strap 314 to a first or front surface 326 of the partition 84 (e.g., the first panel 80 or the second panel 82). In the illustrated example, the strap 314 is positioned (e.g., sandwiched) between the first washer 320 and the second washer 322. As noted above, the first washer 320 and the second washer 322 enable the strap 314 to slide relative to the partition 84 (e.g., the front surface 326) in the lateral direction (e.g., in a direction toward and away from the lateral edges 88, 90 of the partition 84), and prevent or restrict movement of the strap 314 in a longitudinal direction (e.g., in a direction toward and away from the upper edge 92 and the lower edge 94 of the partition 84) and in a direction perpendicular to the plane of the partition 84. Additionally, the first washer 320 and the second washer 322 hold the strap 314 (e.g., in an elongated orientation) to prevent the strap 314 from twisting or turning. In other words, the first washer 320 and the second washer 322 hold the strap 314 substantially flat relative to the front surface 326 as they are separated from each other by a distance 331 substantially equal to (e.g., within 10 percent of) the thickness of the strap 314. In other examples, the first and second washer 320, 322 may be separated from each other by a distance less than or equal to twice the thickness of the strap 314. To this end, the first washer 320 and the second washer 322 prevent an upper edge 328a and a lower edge 328b of the strap 314 from folding or curling (e.g., twisting) toward each other. Thus, the first washer 320 and the second washer 322 maintain the strap 314 in alignment (e.g., horizontal alignment) and enables smooth (e.g., slide) movement of the strap 314 in the lateral direction (e.g., side-to-side direction between the lateral edges). The third washer 324 couples to a second or rear surface 330 of the partition 84 (e.g., a rear surface of the first panel 80 or the second panel 82). Thus, the partition 84 (e.g., the first panel 80 or the second panel 82) is positioned between the second washer 322 and the third washer 324. Thus, the second washer 322 is spaced from the third washer 324 a distance 333 at least equal to the thickness of the partition 84. The first washer 320, the second washer 322 and the third washer 324 each define a body or plate (e.g., an oblong plate) having a first aperture 332 (e.g., a first hole) and a second aperture 334 (e.g., a second hole).

To couple the washers to the partition 84 (e.g., the first panel 80 or the second panel 84) and provide a breakaway feature for the harness 312, the fastener assembly 316 includes a plurality of fasteners 340. The fasteners 340 of the illustrated example are zip ties (e.g., button head zip ties). For example, a first pair 342 of the fasteners 340 couple together and a second pair 344 of the fasteners 340 couple together to couple the washers 320, 322, 324 and the strap 314 to the partition 84. For example, the first pair 342 of the fasteners 340 pass through respective ones of the apertures 332 of the washers 320-324, and the second pair 344 of the fasteners 340 pass through respective ones of the apertures 334 of the washers 320-324. Thus, each set of aligned apertures 342 and 344 receives a respective one of the first pair 342 of fasteners 340 and the second pair 344 of fasteners 340. The partition 84 includes corresponding openings 335 to receive the fasteners 340. In some examples, at least a portion of the terminal ends of the fasteners 340 are counter-sunk into the washers 320, 324. In some examples, the second washer 322 is excluded such that the strap 314 is secured between, and immediately adjacent to the first washer 320 and the surface of the front surface 326 of the partition 84.

To prevent the bulkhead 300 from damage if the harness 312 is accidentally snagged and pulled away from the partition 84 (e.g., by a forklift or other loading machinery), the pairs 342, 344 of fasteners 340 of the harness 312 break apart, separate and/or otherwise rupture to allow the strap 314 and, thus, the washers 320, 322, 324 to separate from the partition 84 without (e.g., permanent or unrepairable) damage to the first panel 80 and/or the second panel 82. The breakaway feature provided by the fasteners 340 is designed to separate in response to a force greater than what would generally be experienced during usual transport and/or loading/unloading conditions, but less than what would cause damage to the partition 84, and particularly the foam core 146 of the partition.

In the illustrated example, the example fasteners 340 are zip ties (e.g., button head zip ties). For example, each pair 342, 344 of fasteners 340 (e.g., zip ties) couple to each other to retain the washers 320-324 and the strap 314. The zip ties disclosed herein provide the assembly 316 with a lower tensile strength which permits a connection between the respective pairs 342, 344 of fasteners 340 to break or rupture when a lower magnitude force is applied between components of the assembly as compared to traditional hardware that includes steel, zinc plated or galvanized bolts, washers, nuts, etc. Such lower tensile force characteristic enables the fasteners 340 to break rather than pulling components of the assembly 316 (e.g., the washers 320, 322, 324) into or through the panels 80, 82 and (e.g., permanently) damaging the panels 80, 82. In this example, if the zip ties rupture or break apart (e.g., upon experiencing a large impact), the zip ties can be replaced without having to replace the panels 80, 82 or any other components of the assembly 316.

To reduce weight of the partition 84, the washers 320, 322, 324 and the fasteners 340 of the illustrated example are composed of plastic or other non-metal or light weight material(s). In addition to reducing an overall weight of the partition 84, the washers 320, 322, 324 and/or the fasteners 340 of the illustrated example, when composed of plastic or other suitable non-metal material(s), prevent corrosion or rusting when the partition 84 is employed with refrigeration applications. Thus, the washers 320-324 and fasteners 340 of the illustrated example provide greater sanitary characteristics compared to traditional hardware that includes zinc plated or galvanized bolts, washers, and nuts, which can significantly improve cleanliness (e.g., reduce harborage) desired in the food and/or drug transport/storage industry. In some examples, the fasteners 340 can be different types of fasteners including, for example, plastic bolts and nuts, plastic screws, rivets, two-piece panel fasteners, snap fasteners or rivets, any other fastener of appropriate length and tensile strength, and/or any other suitable fastener(s). However, in some examples, the washers 320-324 and/or the fasteners 340 can be composed of metal and/or any other suitable material(s).

Figure 39:
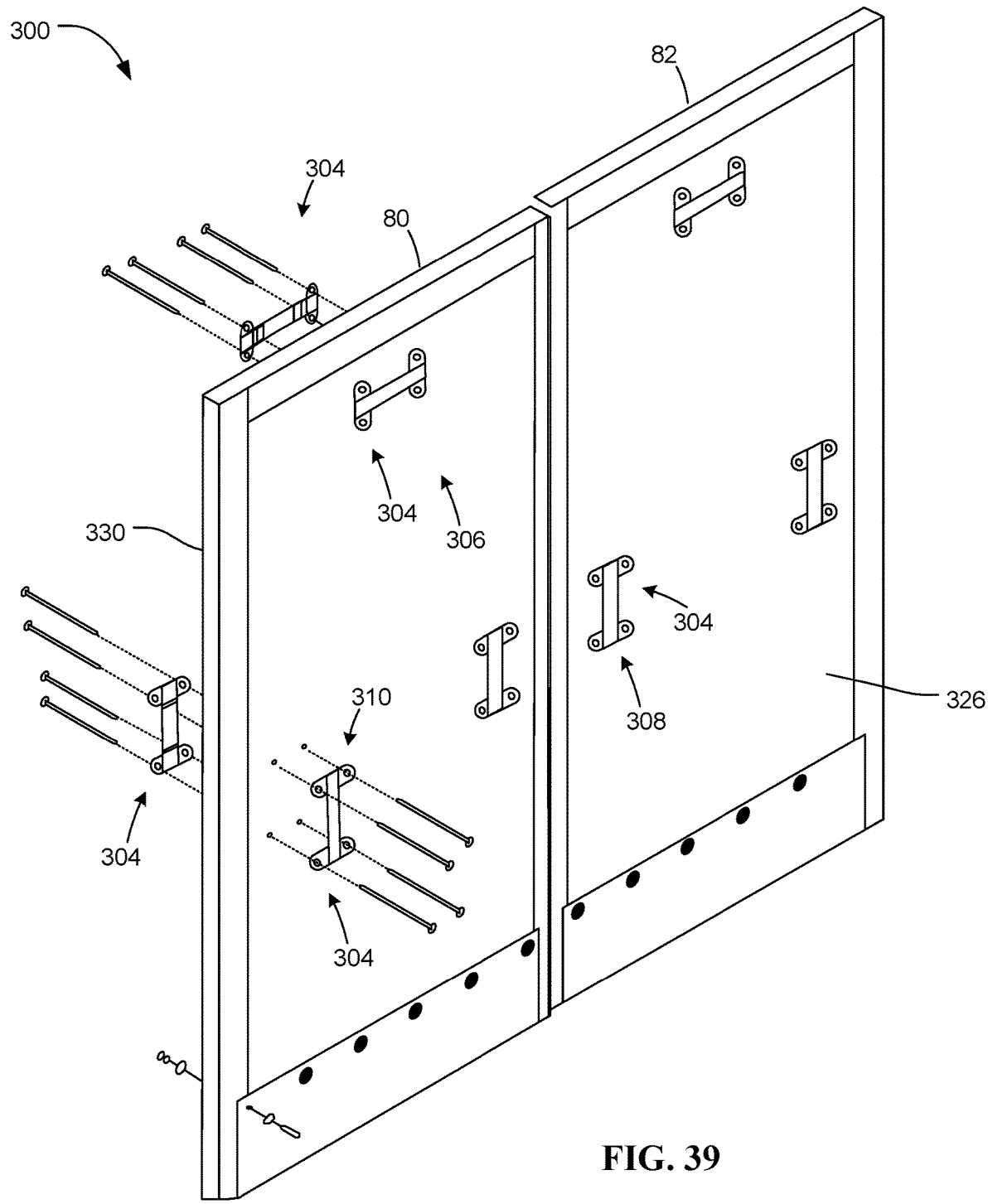
FIG. 39 is perspective, partially assembled view of the example bulkhead of FIG. 36.

FIG. 39 is perspective, partially assembled view of the example bulkhead 300 of FIG. 36. Each of the panels 80 and 82 of the bulkhead 300 of the illustrated example includes the plurality of handles 304 (e.g., the first handles 306, second handles 308 and third handles 310) on the front surface 326 (e.g., a front surface) of the respective panels 80, 82 and the rear surface 330 (e.g., a rear side) of the respective panels 80, 82. However, in some examples, only the first surface 326 or the second surface 330 includes the handles 304. In some examples, the first panel 80 and/or the second panel 82 can have more than three handles 304 on the first surface 326 and/or the second surface 330.

Figure 40A:
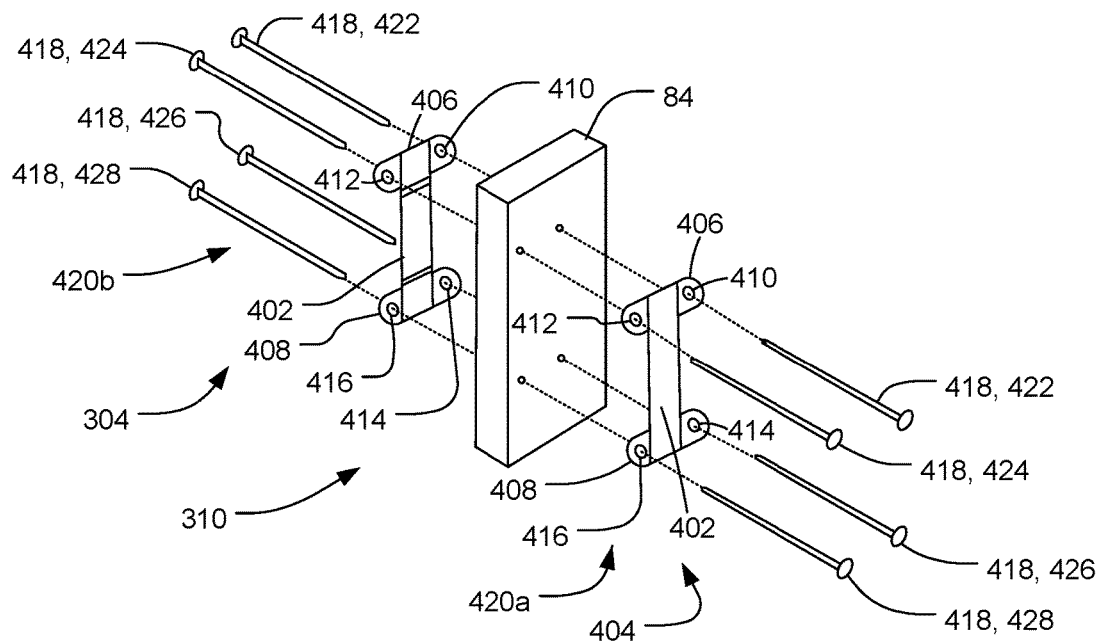
FIGS. 40A and 40B are enlarged partially exploded views of example handles of the example bulkhead 300 of FIG. 39.
Figure 40B:
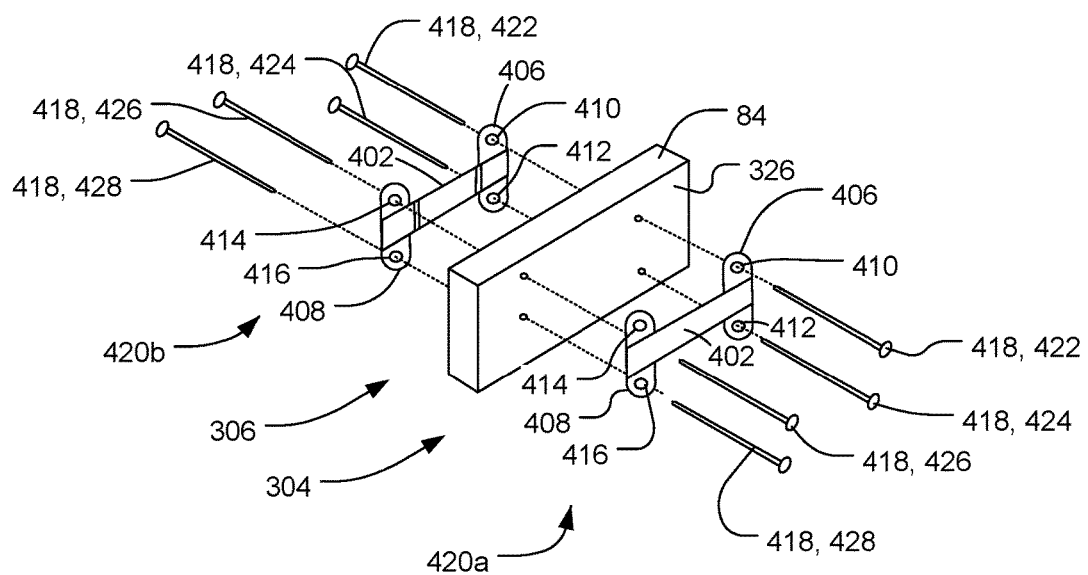

FIGS. 40A and 40B are enlarged partial exploded views of the example handles 304 of FIG. 39. Specifically, FIG. 40A illustrates the third handle 310 of FIG. 39. FIG. 40B illustrates the first handle 306 of FIG. 39. In this example, the handles 306 and 310 are identical except for the orientation of the handles 306, 310 relative to the partition 84 (e.g., vertical orientation and horizontal orientation, respectively, as shown in FIG. 36). Referring to FIGS. 40A and 40B, the handles 304 of the bulkhead 300 of the illustrated example includes a strap 402 coupled to the partition 84 via a fastener assembly 404. The fastener assembly 404 of the illustrated example includes a first washer 406 and a second washer 408 spaced from the first washer 406. The first washer 406 and the second washer 408 of the illustrated example each includes a body or plate having apertures 410-416 (e.g., holes) to receive fasteners 418. The first washer 406 of the illustrated example attaches (e.g., is fixed) to a first end of the strap 402 and the second washer 408 of the illustrated example attaches (e.g., is fixed) to a second end of the strap 402 by insertion through a loop formed at each end of the strap 402. Thus, the fastener assembly 404 of the illustrated example does not allow the strap 402 to slide relative to the first washer 406 and the second washer 408. To this end, the strap 402 is fixed in the longitudinal direction and the lateral direction.

The fasteners 418 of the illustrated example are zip ties (e.g., button head zip ties). To couple a first one 420*a* of the handles 304 to the front surface 326 of the partition 84 and a second one 420*b* of the handles 304 to the rear surface 330 of the partition 84, a first pair 422 of the fasteners 418 (e.g., zip ties) couple together via respective first apertures 410 of the first washers 410, a second pair 424 of fasteners 418 couple together via respective second apertures 412 the first washers 406, a third pair 426 of fasteners 418 are coupled together via respective third apertures 414 of the second washers 408, and a fourth pair 428 of fasteners 418 are coupled together via respective fourth apertures 416 of the second washers 408. The first handles 306, the second handles 308 and the third handles 310 of the illustrated example are coupled to the partition 84 in a substantially similar or identical manner. The partition 84 includes openings to receive the fasteners 418. In some examples in which a handle 402 is only provided on one side of the partition 84 (e.g., a first/front surface 326 or a second/rear surface 330), a washer of suitable size and shape and including apertures that align with apertures 410-416 of the handle 402 can be used on the opposite side of the partition 84 in the place of a handle 402.

Figure 41:
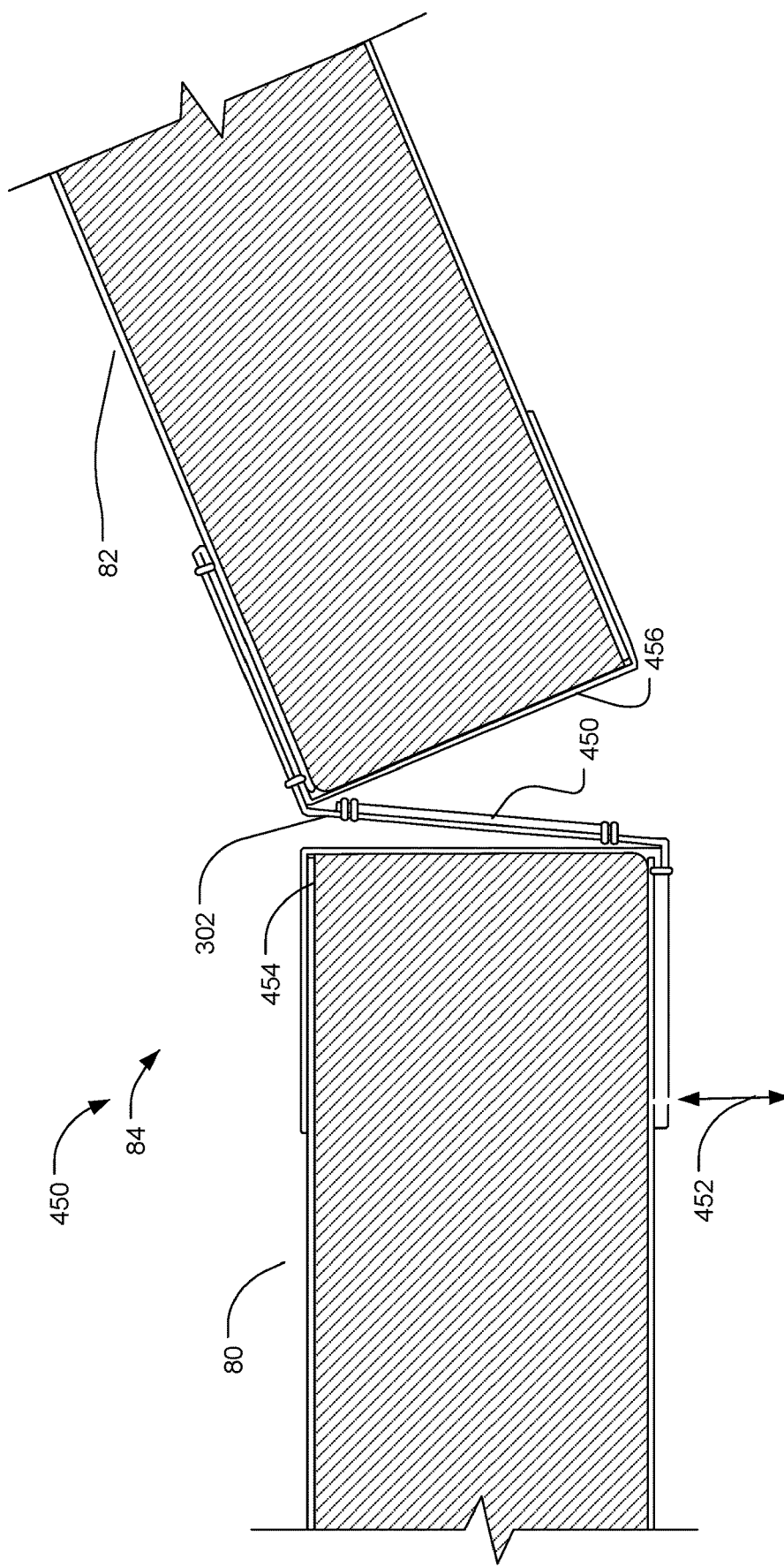
FIG. 41 is a partial, cross-sectional view of a hinge of the example bulkhead of FIG. 36.

FIG. 41 is a partial, cross-sectional view of the hinge 302 of the illustrated example of FIG. 36. The hinge assembly 302 of the illustrated example includes a stiffener 450. The stiffener 450 of the illustrated example extends (e.g., vertically) along the hinge 302 between the upper edge 92 and the lower edge 94. In some examples, the stiffener 450 extends completely between the upper edge 92 and the lower edge 94. In some examples, the stiffener 450 extends partially between the upper edge 92 and the lower edge 94. The stiffener 450 of the illustrated example provides rigidity/support and/or increases a holding force of the hinge 302 to prevent or restrict the first panel 80 and the second panel 82 from moving in a backward or forward direction 452 relative to each other when the partition 84 (e.g., the first panel 80 and the second panel 82) is in a secured or operating position in the storage area 16. For example, the stiffener 450 maintains inner lateral edges 454, 456 (e.g., the vertical edges) of the respective first panel 80 and the second panel 82 in alignment such that the first inner lateral edge 454 of the first panel 80 does not offset relative to the second lateral edge 456 in the forward and backward direction 452 The stiffener 450 of the illustrated example can be material or fabric (e.g., heavy vinyl, folded over fabric) that can be attached to the hinge 302 via, for example, stitching, adhesive, a loop and hook fastener, pocket fastener (e.g., insertion into a pocket) heat welding, and/or any other fastener(s). In some examples, the stiffener can include a stay, a rod, and/or any other suitable structure. Generally, the stiffener 450 is less flexible than the material to which it is connected.

The foregoing examples disclosed herein can be employed with a cargo container of a vehicle, a rail car, and/or any other transport or storage system. Although each example bulkheads and/or other components of the bulkhead disclosed above have certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Example methods, apparatus, systems, and articles of manufacture to implement bulkheads are disclosed herein. Further examples and combinations thereof include the following:

Example 1 includes a bulkhead including a first panel and a second panel adjoining the first panel to define a partition that includes a first lateral edge along the first panel and a second lateral edge along the second panel. The partition has a partition width extending from the first lateral edge to the second lateral edge. A harness is structured to extend beyond the partition width. The harness includes a breakaway fastener assembly that renders the bulkhead in an operative configuration and a restorable breakaway configuration. The breakaway fastener assembly is to couple to the partition when the bulkhead is in the operative configuration, and the breakaway fastener assembly to decouple from the partition when the bulkhead is in the restorable breakaway configuration.

Example 2 includes the bulkhead of example 1, where the breakaway fastener includes a magnet to couple the breakaway section and the partition when the bulkhead is in the operative configuration.

Example 3 includes the bulkhead of examples 1 or 2, where the breakaway fastener includes a touch-and-hold fastener.

Example 4 includes the bulkhead of any one of examples 1-3, where the breakaway feature includes a resiliently releasable fastener.

Example 5 includes the bulkhead of any one of examples 1-4, where the breakaway fastener assembly includes plastic fasteners to couple the harness to the partition.

Example 6 includes the bulkhead of any one of examples 1-5, where the plastic fasteners include zip ties.

Example 7 includes the bulkhead of any one of examples 1-6, where the breakaway fastener assembly further includes a first washer, a second washer and a third washer, the first and second washers to slidably couple a strap to the partition, and the third washer to couple the first and second washers to the partition.

Example 8 includes the bulkhead of any one of examples 1-7, where the first washer, the second washer and the third washer includes a plurality of apertures, respective ones of the apertures of the first washer to align with respective ones of the apertures of the second washer and the third washer, wherein each set of aligned apertures to receive a respective one of the plastic fasteners.

Example 9 includes the bulkhead of any one of examples 1-8, where at least one of the harness and the breakaway section includes a strap.

Example 10 includes the bulkhead of any one of examples 1-9, where the first panel includes a cover sheet overlying a foam core, and a resiliently compressible foam seal along the first lateral edge of the first panel, wherein the foam seal is softer than the foam core.

Example 11 includes the bulkhead of any one of examples 1-10, where the breakaway fastener assembly further includes a first washer and a second washer, the first and second washers to couple a strap to the partition.

Example 12 includes the bulkhead of any one of examples 1-11, where at least one of the harness and the breakaway assembly includes a strap and a first washer, the strap positioned between the washer and the panel or a second washer, the gap defined between the first washer and the panel or the second washer substantially equal to the thickness of the strap.

Example 13 includes the bulkhead of any one of examples 1-12, where the first panel includes a cover sheet overlying a foam core, and a resiliently compressible foam seal along the first lateral edge of the first panel, wherein the foam seal is softer than the foam core, the foam seal including a void.

Example 14 includes the bulkhead of any one of examples 1-13, where the first panel is pivotally coupled to the second panel via a hinge, and further including a hinge stiffener coupled to the hinge, the hinge stiffener being more rigid than the hinge.

Example 15 includes the bulkhead of any one of examples 1-14, where the harness that includes a middle section, a first pair of branches, and a second pair of branches, the middle section positioned between the first lateral edge and the second lateral edge, the first pair of branches to extend from a first end of the middle section and structured to extend past the first lateral edge, the second pair of branches to extend from a second end of the middle section and structured to extend past the second lateral edge.

Example 16 includes the bulkhead of any one of examples 1-15, where the first pair of branches extending from the first end of the middle section diverge from each other to terminate at a first upper end and a first lower end, and the second pair of branches extending from the second end of the middle section diverge from each other to terminate at a second upper end and a second lower end.

Example 17 includes the bulkhead of any one of examples 1-16, where the first pair of branches define a first acute angle therebetween, and the second pair of branches define a second acute angle therebetween.

Example 18 includes the bulkhead of any one of examples 1-17, where the first pair of branches include a first pair of clips, and the second pair of branches include a second pair of clips.

Example 19 includes the bulkhead of any one of examples 1-18, where tension in the middle section is transmitted to both the first pair of branches and the second pair of branches.

Example 20 includes the bulkhead of any one of examples 1-19, where wherein the partition further includes: an upper edge extending between the first lateral edge and the second lateral edge, and a lower edge extending between the first lateral edge and the second lateral edge, the first lateral edge being substantially parallel to the second lateral edge, the upper edge being substantially parallel to the lower edge, the partition having a partition width extending from the first lateral edge to the second lateral edge; a first lip seal disposed along the first lateral edge; and a second lip seal disposed along the second lateral edge, each of the first lip seal and the second lip seal including a resiliently flexible sheet of material, the first lip seal and the second lip seal each having a relaxed state and a deflected state, the first lip seal and the second lip seal defining a first width therebetween when in the relaxed state, the first lip seal and the second lip seal defining a second width therebetween when in the deflected state, the first width being greater than the second width Example 21 includes the bulkhead of any one of examples 1-20, where the first lip seal is one of a first pair of lip seals disposed along the first lateral edge, and the second lip seal is one of a second pair of lip seals disposed along the second lateral edge.

Example 22 includes the bulkhead of any one of examples 1-21, where the first pair of lip seals diverge to define a first angle therebetween, and the second pair of lip seals diverge to define a second angle therebetween.

Example 23 includes the bulkhead of any one of examples 1-22, where the partition includes a foam core and a resiliently compressible foam seal, and the foam seal is interposed between the foam core and the first pair of lip seals.

Example 24 includes the bulkhead of any one of examples 1-23, where the foam seal is softer than the foam core.

Example 25 includes the bulkhead of any one of examples 1-24, further including a cover sheet overlying the foam core and the foam seal.

Example 26 includes the bulkhead of any one of examples 1-25, further including a first handle coupled to the first panel adjacent an upper edge of the first panel, the first handle including a first longitudinal axis that is substantially parallel relative to the upper edge of the first panel.

Example 27 includes the bulkhead of any one of examples 1-26, further including a first handle and a second handle coupled to the first panel, the first handle including a first longitudinal axis and the second handle having a second longitudinal axis, the first longitudinal axis oriented relative to the second longitudinal axis at an angle between approximately 45 degrees and 90 degrees.

Example 28 includes the bulkhead of any one of examples 1-27, further including a plurality of first handles positioned on a first side of the partition and a plurality of second handles positioned on a second side of the partition opposite the first side.

Example 29 includes the bulkhead of any one of examples 1-28, where respective ones of the first handles align with respective ones of the second handles, each of the respective ones of the first handles includes a first washer and each of the respective ones of the second handles includes a second washer, the first washer of the respective ones of the first handles to couple to the second washer of the respective ones of the second handles via fasteners.

Example 30 includes the bulkhead of any one of examples 1-29, further including a first handle, a second handle and a third handle coupled to the first panel, the first handle being out of lateral alignment relative to the second handle and the third handle, and the second handle and the third handle being out of vertical alignment relative to the first handle.

Example 31 includes a bulkhead including a first panel and a second panel adjoining the first panel via a hinge to provide a partition that includes a first lateral edge along the first panel, a second lateral edge along the second panel, an upper edge extending between the first lateral edge and the second lateral edge, and a lower edge extending between the first lateral edge and the second lateral edge. The first lateral edge is substantially parallel to the second lateral edge. The upper edge is substantially parallel to the lower edge. The partition has a partition width extending from the first lateral edge to the second lateral edge. A first handle is positioned adjacent the upper edge. A second handle is positioned adjacent the hinge. A third handle is positioned adjacent the first lateral edge. The first handle is offset relative to the second handle and the third handle in a direction between the upper edge and the lower edge. The second handle is laterally offset relative to the third handle in a direction between the first lateral edge and the second lateral edge.

Example 32 includes the bulkhead of example 31, further including a hinge stiffener coupled to the hinge.

Example 33 includes the bulkhead of examples 31 or 32, where the first handle has a first longitudinal axis oriented substantially parallel relative to the upper edge, the second handle has a second longitudinal axis and the third handle has a third longitudinal axis, the second and third longitudinal axes being oriented substantially perpendicular relative to the first longitudinal axis and substantially parallel relative to the first lateral edge.

Example 34 includes a bulkhead including a first panel and a second panel adjoining the first panel to create a partition that includes a first lateral edge along the first panel and a second lateral edge along the second panel, the partition having a partition width extending from the first lateral edge to the second lateral edge. A harness that includes a middle section, a first pair of branches, and a second pair of branches. The middle section is positioned between the first lateral edge and the second lateral edge. The first pair of branches to extend from a first end of the middle section and structured to extend past the first lateral edge. The second pair of branches to extend from a second end of the middle section and structured to extend past the second lateral edge.

Example 35 includes the bulkhead of example 34, where the first pair of branches extending from the first end of the middle section diverge from each other to terminate at a first upper end and a first lower end, and the second pair of branches extending from the second end of the middle section diverge from each other to terminate at a second upper end and a second lower end.

Example 36 includes the bulkhead of examples 34 or 35, where the first pair of branches define a first acute angle therebetween, and the second pair of branches define a second acute angle therebetween.

Example 37 includes the bulkhead of any one of examples 34-36, where the first pair of branches include a first pair of clips, and the second pair of branches include a second pair of clips.

Example 38 includes the bulkhead of any one of examples 34-37, where tension in the middle section is transmitted to both the first pair of branches and the second pair of branches.

Example 39 includes a bulkhead including a first panel and a second panel adjoining the first panel to provide a partition that includes a first lateral edge along the first panel, a second lateral edge along the second panel, an upper edge extending between the first lateral edge and the second lateral edge, and a lower edge extending between the first lateral edge and the second lateral edge. The first lateral edge is substantially parallel to the second lateral edge, the upper edge is substantially parallel to the lower edge. The partition has a partition width extending from the first lateral edge to the second lateral edge. A first lip seal is disposed along the first lateral edge and a second lip seal is disposed along the second lateral edge. Each of the first lip seal and the second lip seal includes a resiliently flexible sheet of material. The first lip seal and the second lip seal each having a relaxed state and a deflected state. The first lip seal and the second lip seal define a first width therebetween when in the relaxed state. The first lip seal and the second lip seal define a second width therebetween when in the deflected state, the first width being greater than the second width.

Example 40 includes the bulkhead of example 39, where the first lip seal is one of a first pair of lip seals disposed along the first lateral edge, and the second lip seal is one of a second pair of lip seals disposed along the second lateral edge.

Example 41 includes the bulkhead of examples 39 or 40, where the first pair of lips diverge to define a first angle therebetween, and the second pair of lips diverge to define a second angle therebetween.

Example 42 includes the bulkhead of any one of examples 39-41, where the partition includes a foam core and a resiliently compressible foam seal, and the foam seal is interposed between the foam core and the first pair of lip seals.

Example 43 includes the bulkhead of any one of examples 39-42, where the foam seal is softer than the foam core.

Example 44 includes the bulkhead of any one of examples 39-43, further including a cover sheet overlying the foam core and the foam seal.

Example 45 includes a bulkhead including a first panel that includes a foam core, a second panel adjoining the first panel to create a partition, a handle receptacle recessed within the foam core of the first panel, and a handle disposed within the handle receptacle.

Example 46 includes the bulkhead of example 45, where the handle is movable between an operative position and a stored position, the handle to extend from within the handle receptacle to a greater extent when the handle is in the operative position than when the handle is in the stored position, and the handle being spring biased to the stored position.

Example 47 includes the bulkhead of examples 45 or 46, further including a cover sheet overlying the foam core, and an outer peripheral flange extending from the handle receptacle, wherein at least part of the cover sheet is positioned between the foam core and the outer peripheral flange.

Example 48 includes a bulkhead including a first panel that includes a foam core and a second panel adjoining the first panel to create a partition that includes a first lateral edge along the first panel and a second lateral edge along the second panel. The partition having a partition width extending between the first lateral edge and the second lateral edge. A foam seal is disposed along the first lateral edge, the foam seal being softer than the foam core. The foam seal defines an elongate hollow space extending substantially parallel to the first lateral edge. A cover sheet overlays the foam core and the foam seal.

Example 49 includes the bulkhead of example 48, where the elongate hollow space defined by the foam seal is further defined by the cover sheet.

Although certain example methods, apparatus and articles of manufacture have been disclosed herein, the scope of coverage of this patent is not limited thereto. On the contrary, this patent covers all methods, apparatus, and articles of manufacture fairly falling within the scope of the claims of this patent.

The invention claimed is:

1. A bulkhead comprising:
a first panel;
a second panel adjoining the first panel to define a partition that includes a first lateral edge along the first panel and a second lateral edge along the second panel, the partition having a partition width extending from the first lateral edge to the second lateral edge; and
a first handle and a second handle coupled to the first panel, the first handle including a first longitudinal axis and the second handle having a second longitudinal axis, the first longitudinal axis having a first orientation and the second longitudinal axis having a second orientation different than the first orientation, the first handle and the second handle extending away from a front face of the first panel.

2. The bulkhead of claim 1, further including a harness structured to extend beyond the partition width, the harness including a breakaway fastener assembly, wherein the breakaway fastener assembly includes plastic fasteners to couple the harness to the partition.

3. The bulkhead of claim 2, wherein the plastic fasteners include zip ties.

4. The bulkhead of claim 2, wherein the breakaway fastener assembly further includes a first washer, a second washer and a third washer, the first and second washers to slidably couple a strap to the partition, and the third washer to couple the first and second washers to the partition.

5. The bulkhead of claim 4, wherein a distance between the first washer and the second washer is at least equal to a thickness of the strap.

6. The bulkhead of claim 4, wherein a distance between the second washer and the third washer is at least equal to a thickness of the partition.

7. The bulkhead of claim 4, wherein the first washer, the second washer and the third washer include a plurality of apertures, respective ones of the apertures of the first washer to align with respective ones of the apertures of the second washer and the third washer, wherein each set of aligned apertures to receive a respective one of the plastic fasteners.

8. The bulkhead of claim 2, wherein the breakaway fastener assembly further includes a first washer and a second washer, the first and second washers to couple a strap to the partition.

9. The bulkhead of claim 1, further including a harness structured to extend beyond the partition width, the harness including a breakaway fastener assembly, wherein at least one of the harness and the breakaway fastener assembly includes a strap and a first washer, the strap positioned between at least one of the first washer and the partition or a second washer, a gap defined between the at least one of the first washer and the partition or the second washer substantially equal to a thickness of the strap.

10. The bulkhead of claim 1, wherein the first panel is pivotally coupled to the second panel via a hinge, and further including a hinge stiffener coupled to the hinge, the hinge stiffener being more rigid than the hinge.

11. The bulkhead of claim 1, wherein the partition further includes:
a first lip seal disposed along the first lateral edge; and
a second lip seal disposed along the second lateral edge, each of the first lip seal and the second lip seal including a resiliently flexible sheet of material, the first lip seal and the second lip seal each having a relaxed state and a deflected state, the first lip seal and the second lip seal defining a first width therebetween when in the relaxed state, the first lip seal and the second lip seal defining a second width therebetween when in the deflected state, the first width being greater than the second width.

12. The bulkhead of claim 1, wherein the first handle is coupled to the first panel adjacent an upper edge of the partition.

13. The bulkhead of claim 1, wherein the first longitudinal axis is oriented relative to the second longitudinal axis at an angle between approximately 45 degrees and 90 degrees.

14. A bulkhead comprising:
a first panel including an upper edge, a lower edge opposite the upper edge, a first lateral edge, and a second lateral edge opposite the first lateral edge;
a first handle positioned adjacent the upper edge;
a second handle positioned adjacent the second lateral edge; and
a third handle positioned adjacent the first lateral edge, the first handle is offset relative to the second handle and the third handle in a direction between the upper edge and the lower edge, the second handle being laterally offset relative to the third handle in a direction between the first lateral edge and the second lateral edge.

15. The bulkhead of claim 14, further including a second panel adjoining the first panel via a hinge to provide a partition, and further including a hinge stiffener coupled to the hinge.

16. The bulkhead of claim 14, wherein the first handle has a first longitudinal axis oriented substantially parallel relative to the upper edge, the second handle has a second longitudinal axis and the third handle has a third longitudinal axis, the second and third longitudinal axes being oriented substantially perpendicular relative to the first longitudinal axis and substantially parallel relative to the first lateral edge.

17. The bulkhead of claim 1, further including a third handle coupled to the first panel, the third handle being out of vertical alignment relative to the first handle, the third handle being out of lateral alignment relative to the first handle and the second handle, and wherein the third handle is vertical aligned relative to the second handle.

18. The bulkhead of claim 1, wherein the first handle is out of lateral alignment relative to the second handle.

19. A bulkhead comprising:
a partition including a first panel movably coupled to a second panel via a hinge; and
a plurality of first handles positioned on a first side of the partition and a plurality of second handles positioned on a second side of the partition opposite the first side, wherein respective ones of the first handles align with respective ones of the second handles, and wherein at least a respective one of the first handles and at least a respective one of the second handles are positioned adjacent an upper edge of the partition.

20. The bulkhead of claim 19, wherein each of the respective ones of the first handles includes a first washer and each of the respective ones of the second handles includes a second washer, the first washer of the respective ones of the first handles to couple to the second washer of the respective ones of the second handles via fasteners.

21. The bulkhead of claim 19, wherein the at least respective one of the first handles and the at least respective one of the second handles are substantially parallel relative to the upper edge of the partition.

* * * * *